United States Patent
O'Shaughnessy

(10) Patent No.: US 11,243,981 B2
(45) Date of Patent: Feb. 8, 2022

(54) DATABASE REPLICATION BASED ON DATA ACCESS SCORES

(71) Applicant: Oracle International Corporation, Redwood Shores, CA (US)

(72) Inventor: Thomas Mark O'Shaughnessy, Bradford, MA (US)

(73) Assignee: ORACLE INTERNATIONAL CORPORATION, Redwood Shores, CA (US)

(*) Notice: Subject to any disclaimer, the term of this patent is extended or adjusted under 35 U.S.C. 154(b) by 0 days.

(21) Appl. No.: 17/009,515

(22) Filed: Sep. 1, 2020

(65) Prior Publication Data

US 2020/0401606 A1   Dec. 24, 2020

Related U.S. Application Data

(63) Continuation of application No. 16/217,827, filed on Dec. 12, 2018, now Pat. No. 10,810,229.

(60) Provisional application No. 62/748,370, filed on Oct. 19, 2018.

(51) Int. Cl.
    *G06F 16/00* (2019.01)
    *G06F 16/27* (2019.01)
    *G06F 16/245* (2019.01)
    *G06F 3/06* (2006.01)

(52) U.S. Cl.
    CPC .......... *G06F 16/273* (2019.01); *G06F 3/065* (2013.01); *G06F 3/067* (2013.01); *G06F 3/0619* (2013.01); *G06F 16/245* (2019.01)

(58) Field of Classification Search
    CPC .................................................... G06F 16/273
    See application file for complete search history.

(56) References Cited

U.S. PATENT DOCUMENTS

| 7,801,893 | B2 | 9/2010 | Gulli et al. |
| 7,945,743 | B2 | 5/2011 | Belady |
| 8,024,542 | B1 | 9/2011 | Chatterjee et al. |
| 8,452,755 | B1 | 5/2013 | Ye et al. |
| 9,026,741 | B1 | 5/2015 | Derbeko et al. |
| 9,348,752 | B1 | 5/2016 | Parakh et al. |
| 9,483,484 | B1 | 11/2016 | Sridharan et al. |
| 9,977,732 | B1 | 5/2018 | Keeler et al. |
| 2008/0270691 | A1 | 10/2008 | Belady |
| 2014/0181016 | A1 | 6/2014 | Whitehead et al. |

(Continued)

OTHER PUBLICATIONS

U.S. Appl. No. 16/217,827, Notice of Allowance dated Jun. 1, 2020, 9 pages.

*Primary Examiner* — Ajith Jacob
(74) *Attorney, Agent, or Firm* — Kilpatrick Townsend & Stockton LLP

(57) ABSTRACT

A method of prioritizing replication of database objects between storage devices includes receiving a request to replicate data from a first to a second storage device; accessing a queries previously executed on the first device; determining database objects associated with the queries; calculating access metrics for the database objects indicating how the database objects were accessed by the queries; determining a subset of database objects for replication based on the access metrics; and initiating a data replication process to replicate the subset of database objects from the first device to the second device that prioritizes the subset of database objects relative to a remainder of the database objects.

20 Claims, 9 Drawing Sheets

(56) References Cited

U.S. PATENT DOCUMENTS

2014/0201161 A1* 7/2014 Kumarasamy ...... G06F 11/1469
707/679
2015/0161517 A1 6/2015 Bae et al.
2016/0188723 A1 6/2016 Zhang et al.

* cited by examiner

FIG. 2

DATABASE REPLICATION BASED ON DATA ACCESS SCORES

CROSS-REFERENCE TO RELATED APPLICATIONS

The present application is a continuation of U.S. patent application Ser. No. 16/217,827, filed Dec. 12, 2018, entitled "DATABASE REPLICATION BASED ON DATA ACCESS SCORES", which is incorporated herein by reference.

U.S. patent application Ser. No. 16/217,827 is claims the benefit of U.S. Provisional Patent Application No. 62/748,370, filed Oct. 19, 2018, entitled "DATABASE REPLICATION BASED ON DATA ACCESS SCORES," which is incorporated herein by reference.

BACKGROUND

With the expansion of Internet applications and services, cloud-based systems, enterprise computing networks and systems and other remote storage solutions, both the amount and functional sophistication of data stored and accessible from remote storage systems continues to grow. Such systems continues to drive the need for large-scale and sophisticated data storage systems, including data storage features such as database replication, caching, and system mirroring, and storage systems includes these features are increasingly being designed and deployed. Many large-scale data storage systems utilize storage appliances that include arrays of storage media, and may be capable of storing many terabytes or even petabytes of data. In some storage systems, multiple storage appliances may be networked together to form storage clusters, further increasing the volume available for storing data. Storage appliances arranged in a cluster may be configured to replicate data, so that if one of the storage appliances becomes inoperable, the data is available at another storage location.

Additionally, tiered storage systems may assign of different data objects, data categories, or types of data, to different storage devices and/or different storage media, in order to reduce the total cost of storage while maximizing the storage efficiency with respect to data retrieval and updating. Further, computing and storage concepts such as local caching, edge caching, and/or edge computing may include techniques in improve the network access speed to data, by storing multiple copies of data and/or storing data content closer to the end users that will be accessing the data. The effect of local caching, edge caching, and the like, is to improve data access performance, and/or to allow multiple data operations to be combined into single operations across the network.

The data storage networks for such systems may support data replication from one or more source storage appliances (e.g., computing devices or servers) to target storage appliances (e.g., computing devices or servers), for various purposes including disaster recovery, data distribution, disk-to-disk backup, data migration, and the like. During replication, snapshots of the various databases, file systems, volumes, and/or other individual storage objects on a source storage system/appliance may be generated and transferred to a target storage system/appliance. Replication is often a time intensive process, and the usefulness of the data replication process may depend a number of factors, including the availability of storage at the target system, the network transaction characteristics (e.g., bandwidth, speed, cost), the number of data queries/transactions that occur and can be handled by the target systems, and whether the replication is performed by generating read-only copies of the data or whether writing is supported to the replicated target data.

BRIEF SUMMARY

Accordingly, the embodiments described herein relate to hardware- and software-based techniques (e.g., methods, systems, devices, computer-readable media storing computer-executable instructions used to perform computing functions, etc.) for performing data replication, migration, and other data transfer processes between physical storage devices. Further, the techniques described herein relate to calculating access metrics for particular database objects, and then initiating data replication processes and/or other data transfers for determined subset of the database objects, based on the access metrics for the subsets of database objects. For example, certain embodiments described herein include determining data access scores (which also may be referred to herein as popularity scores) for particular database objects stored within a database, cloud-based storage, or other physical storage device, or across multiple storage devices. Based on the data access scores of various database objects, including tables, columns, indexes, and/or other data objects, a replication engine or other data transfer system may determine particular subsets of the database objects to be replicated, and then may initiate a replication process or other data transfer process.

In accordance with certain techniques described herein, a replication engine within a distributed storage network may receive a data replication request to replicate data from a first physical storage device to a second physical storage device. In response to the request, the replication engine may retrieve data from a query execution log of the first physical storage device, corresponding to a plurality of queries previously executed on the first physical storage device. For each of the plurality of previously executed queries, the replication engine may determine a set of database objects, such as tables (and/or specific columns), indexes, procedures, user profiles, etc., associated with the previously executed query. In some cases, the associated database objects may be determined based on an analysis of the text (e.g., SQL full text) of the executed query and/or other analysis techniques. The determined database objects may correspond to objects that, per the analysis, were definitively accessed during the execution of the query. Additionally or alternatively, the determined database objects may correspond to objects that, per the analysis, were potentially accessed (but not definitely accessed) during the execution of the query. Then, for each of the determined database objects, the replication engine may calculate access metrics, for example, by aggregating the number of executions of each query and/or the associations between each query and the particular database objects. The replication engine then may determine one or more subsets of the database objects for replication based on the calculated access metrics, wherein additional subsets of the database objects are not selected for replication based on having lower access metrics. One or more data replication processes then may be initiated to replicate the selected subsets of database objects between the physical storage devices, where the additional subsets of the database objects are not replicated based on the differences in their calculated access metrics.

BRIEF DESCRIPTION OF THE DRAWINGS

FIG. 2 is an example of a customized dashboard user interface that can be used to configure, monitor, and control a service instance, in accordance with one or more embodiments of the present invention.

Figure 1:
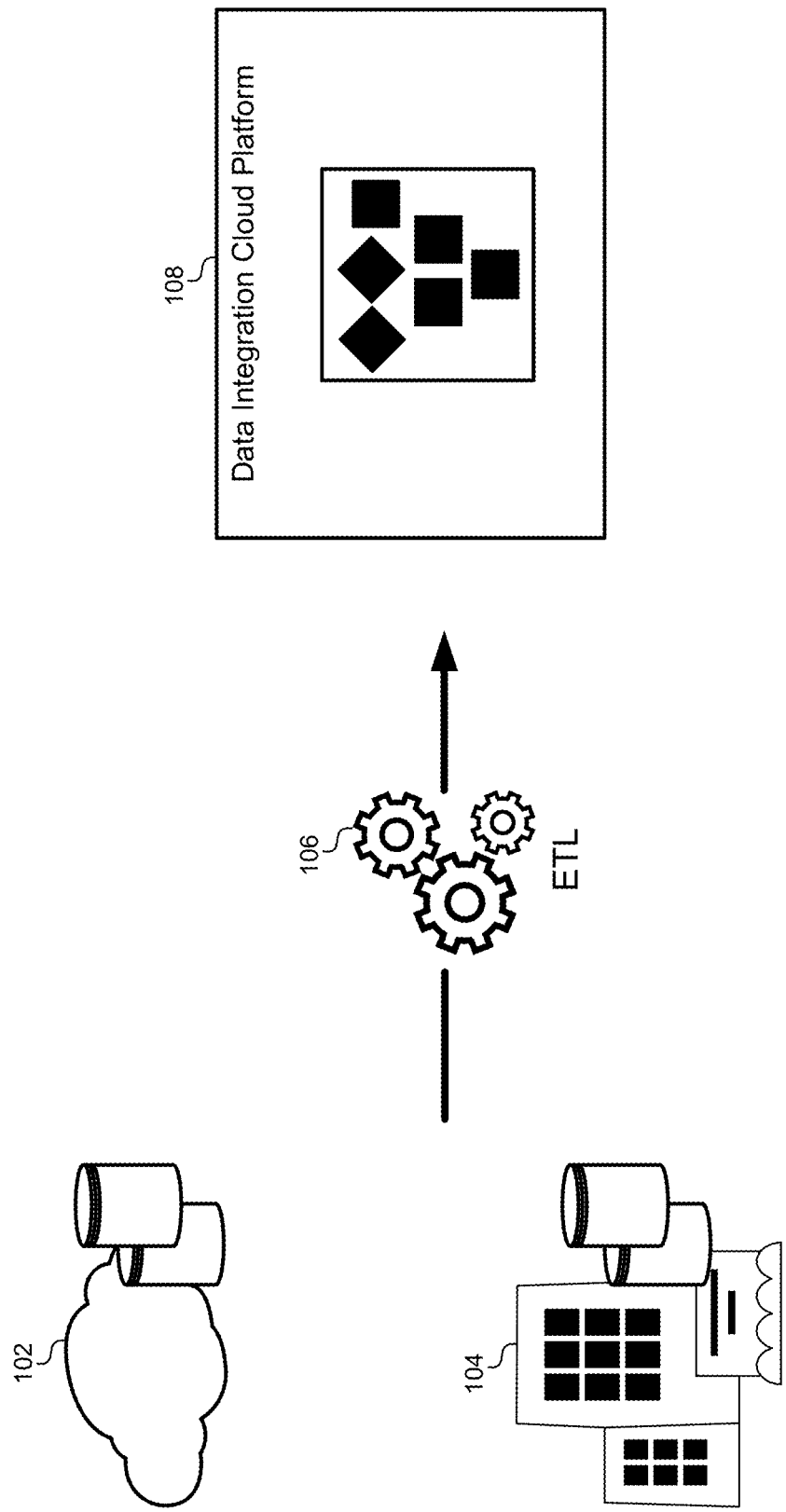
FIG. 1 illustrates a computer system architecture that utilizes a Data Integration Platform Cloud (DIPC) to integrate data from various existing platforms, in accordance with one or more embodiments of the present invention.

In the appended figures, similar components and/or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION 1001.81 In the following description, for the purposes of explanation, specific details are set forth in order to provide a thorough understanding of various implementations and examples. It will be apparent, however, that various implementations may be practiced without these specific details. For example, circuits, systems, algorithms, structures, techniques, networks, processes, and other components may be shown as components in block diagram form in order not to obscure the implementations in unnecessary detail. The figures and description are not intended to be restrictive.

Some examples, such as those disclosed with respect to the figures in this disclosure, may be described as a process which is depicted as a flowchart, a flow diagram, a data flow diagram, a structure diagram, a sequence diagram, or a block diagram. Although a sequence diagram or a flowchart may describe the operations as a sequential process, many of the operations may be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination may correspond to a return of the function to the calling function or the main function.

The processes depicted herein, such as those described with reference to the figures in this disclosure, may be implemented in software (e.g., code, instructions, program) executed by one or more processing units (e.g., processors cores), hardware, or combinations thereof. The software may be stored in a memory (e.g., on a memory device, on a non-transitory computer-readable storage medium). In some examples, the processes depicted in sequence diagrams and flowcharts herein can be implemented by any of the systems disclosed herein. The particular series of processing steps in this disclosure are not intended to be limiting. Other sequences of steps may also be performed according to alternative examples. For example, alternative examples of the present disclosure may perform the steps outlined above in a different order. Moreover, the individual steps illustrated in the figures may include multiple sub-steps that may be performed in various sequences as appropriate to the individual step. Furthermore, additional steps may be added or removed depending on the particular applications. One of ordinary skill in the art would recognize many variations, modifications, and alternatives.

In some examples, each process in the figures of this disclosure can be performed by one or more processing units. A processing unit may include one or more processors, including single core or multicore processors, one or more cores of processors, or combinations thereof. In some examples, a processing unit can include one or more special purpose co-processors such as graphics processors, Digital Signal Processors (DSPs), or the like. In some examples, some or all of the processing units can be implemented using customized circuits, such as Application Specific Integrated Circuits (ASICs), or Field programmable gate arrays (FPGAs).

Various techniques (e.g., methods, systems, computing devices, non-transitory computer-readable storage memory storing a plurality of instructions executable by one or more processors, etc.) are described herein for performing data replication, migration, and other data transfer processes between physical storage devices. Further techniques described herein relate to calculating access metrics for particular database objects, and then initiating data replication processes and/or other data transfers for determined subset of the database objects, based on the access metrics for the subsets of database objects. For example, certain embodiments described herein include determining data access scores (which also may be referred to herein as popularity scores) for particular database objects stored within a database, cloud-based storage, or other physical storage device, or across multiple storage devices. Based on the data access scores of various database objects, including tables, columns, indexes, and/or other data objects, a replication engine or other data transfer system may determine particular subsets of the database objects to be replicated, and then may initiate a replication process or other data transfer process.

In accordance with certain techniques described herein, a replication engine within a distributed storage network may receive a data replication request to replicate data from a first physical storage device to a second physical storage device. In response to the request, the replication engine may retrieve data from a query execution log of the first physical storage device, corresponding to a plurality of queries previously executed on the first physical storage device. For each of the plurality of previously executed queries, the replication engine may determine a set of database objects, such as tables (and/or specific columns), indexes, procedures, user profiles, etc., associated with the previously executed query. In some cases, the associated database objects may be determined based on an analysis of the text (e.g., SQL full text) of the executed query and/or other analysis techniques. The determined database objects may correspond to objects that, per the analysis, were definitively accessed during the execution of the query. Additionally or alternatively, the determined database objects may correspond to objects that, per the analysis, were potentially accessed (but not definitely accessed) during the execution of the query. Then, for each of the determined database objects, the replication engine may calculate access metrics, for example, by aggregating the number of executions of each query and/or the associations between each query and the particular database objects. The replication engine then may determine one or more subsets of the database objects for replication based on the calculated access metrics, wherein additional subsets of the database objects are not selected for replication based on having lower access metrics. One or more data replication processes then may be initiated to replicate the selected subsets of database objects between the physical storage devices, where the additional subsets of the database objects are not replicated based on the differences in their calculated access metrics.

Described herein, are embodiments implemented as part of a Data Integration Platform Cloud (DIPC). In general, data integration involves combining data residing in different data sources and providing users with unified access and a unified view of the data and corresponding metadata. This process often arises and becomes significant in many situations, such as merging commercial entities with existing legacy databases. Data integration is beginning to appear more frequently in Enterprise software systems as the volume of data continues to increase along with the ability to analyze the data to provide useful results ("big data"). For example, consider a web application where users can query a variety of types of travel information (e.g., weather, hotels, airlines, demographics, crime statistics, etc.). Instead of requiring all of these various data types to be stored in a single database with a single schema, an Enterprise application can instead use the unified views and virtual schemas in the DIPC to combine many heterogeneous data sources such that they can be presented in a unified view to the user.

The DIPC is a cloud-based platform for data transformation, integration, replication, and governance. It provides batch and real-time data movement between cloud and on-premises data sources while maintaining data consistency with default-tolerance and resiliency. The DIPC may be used to connect to various data sources and prepare, transform, replicate, govern, and/or monitored data from these various sources as they are combined into one or more data warehouses. The DIPC can work with any type of data source and support any type of data in any format. The DIPC can use a Platform as a Service (PaaS) or Infrastructure as a Service (IaaS) architecture to provide cloud-based data integration for an Enterprise.

The DIPC may provide a number of different utilities, including transferring entire data sources to new cloud-based deployments and allowing cloud databases to be easily accessed from the cloud platform. Data can be streamed in real-time to new data sources up-to-date and to keep any number of distributed data sources synchronized. Loads may be divided amongst synchronized data sources such that they remain highly available to end-users. An underlying data management system can be used to reduce the amount of data moved over the network for deployments into a database cloud, a big data cloud, third-party clouds, and so forth. A drag-and-drop user interface can be used to execute reusable Extract, Load, and Transform, (ELT) functions and templates. Real-time test environments can be created to perform reporting and data analytics in the cloud on replicated data sources such that the data can remain highly available to end-users. Data migrations can be executed with zero downtime using duplicated, synchronized data sources. The synchronized data sources can also be used for a seamless disaster recovery to maintain availability.

Referring now to FIG. 1, an illustrative diagram of a computer system architecture is shown that utilizes the DIPC to integrate data from various existing platforms, according to some embodiments. A first data source 102 may include a cloud-based storage repository. A second data source 104 may include an on-premises data center. In order to provide uniform access and views to the first data source 102 and the second data source 104, the DIPC 108 can use an existing library of high-performance ELT functions 106 to copy data from the first data source 102 and the second data source 104. The DIPC 108 can also extract, enrich, and transform the data as it is stored in a new cloud platform. The 108 can then provide access to any big data utilities that are resident in or accessible by the cloud platform. In some embodiments, the original data sources 102, 104 may continue to provide access to customers, while replicated data sources in the cloud platform can be used for testing, monitoring, governance, and big data analytics. In some embodiments, data governance may be provided to profile, cleanse, and govern data sources within an existing set of customized dashboards in a user interface.

Figure 2:
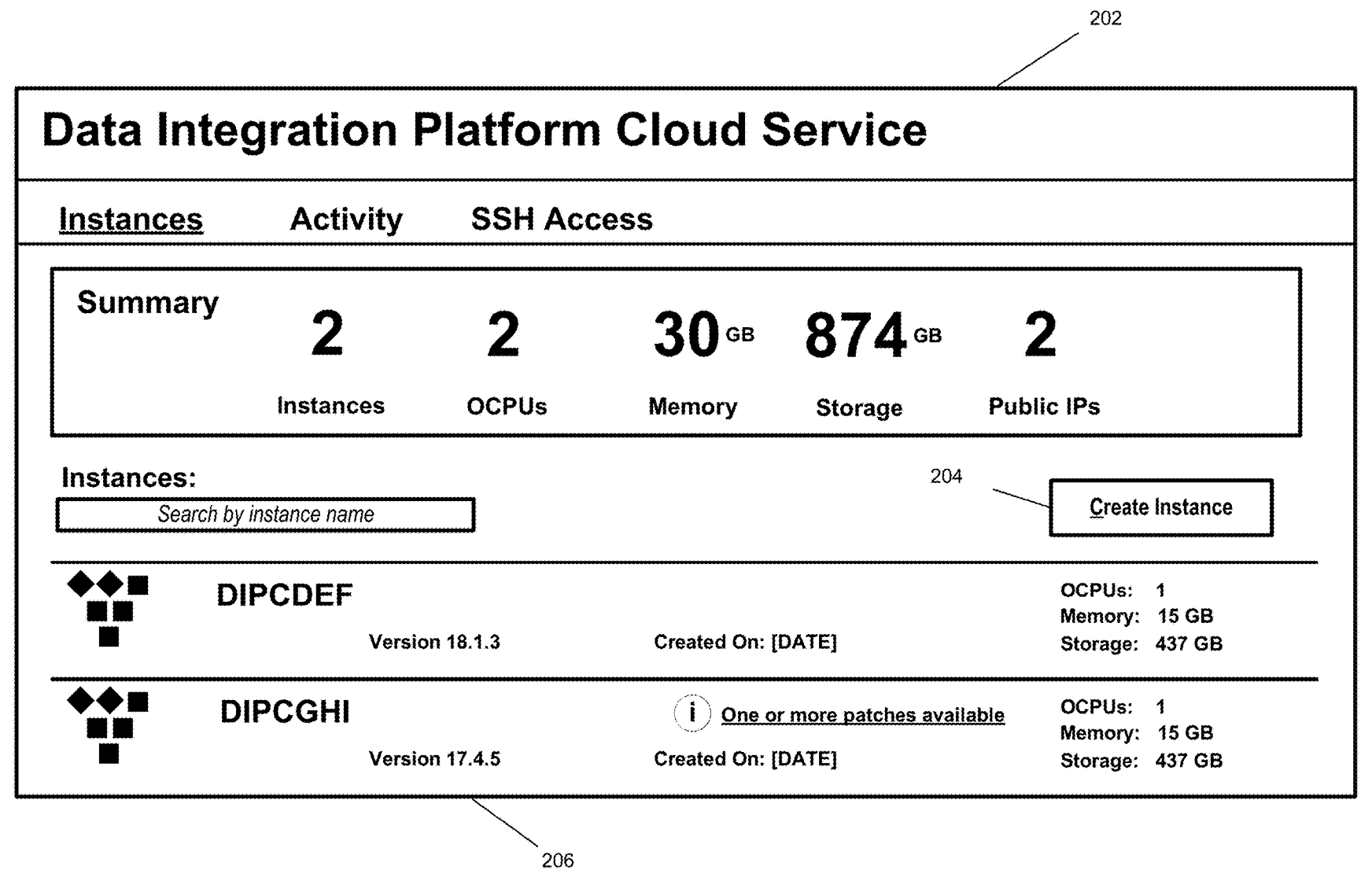

Referring now to FIG. 2, an illustrative diagram is shown of a customized dashboard in a user interface that may be used to configure, monitor, and control a service instance in the DIPC 108. A summary dashboard 202 can provide a control 204 that allows users to create a service instance. Next, a series of progressive web forms can be presented to walk the user through the types of information used to create a service instance. In a first step, the user will be asked to provide a service name and description with an email address and a service edition type. The user may also be asked for a cluster size, which specifies a number of virtual machines used in the service. The service edition type determines which applications are installed on the virtual machines. In a second step and corresponding web form, the user may provide a running cloud database deployment to store the schemas of the DIPC server. The same database may later be used to store data entities and perform integration tasks. Additionally, a storage cloud may be specified and/or provisioned as a backup utility. The user may also provide credentials that can be used to access the existing data sources used in the data integration. In a third step, the provisioning information can be confirmed and a service instance can be created. The new service instance may then be displayed in the summary area 206 of the summary dashboard 202. From there, the user can access any information for any running data integration service instance.

Figure 3:
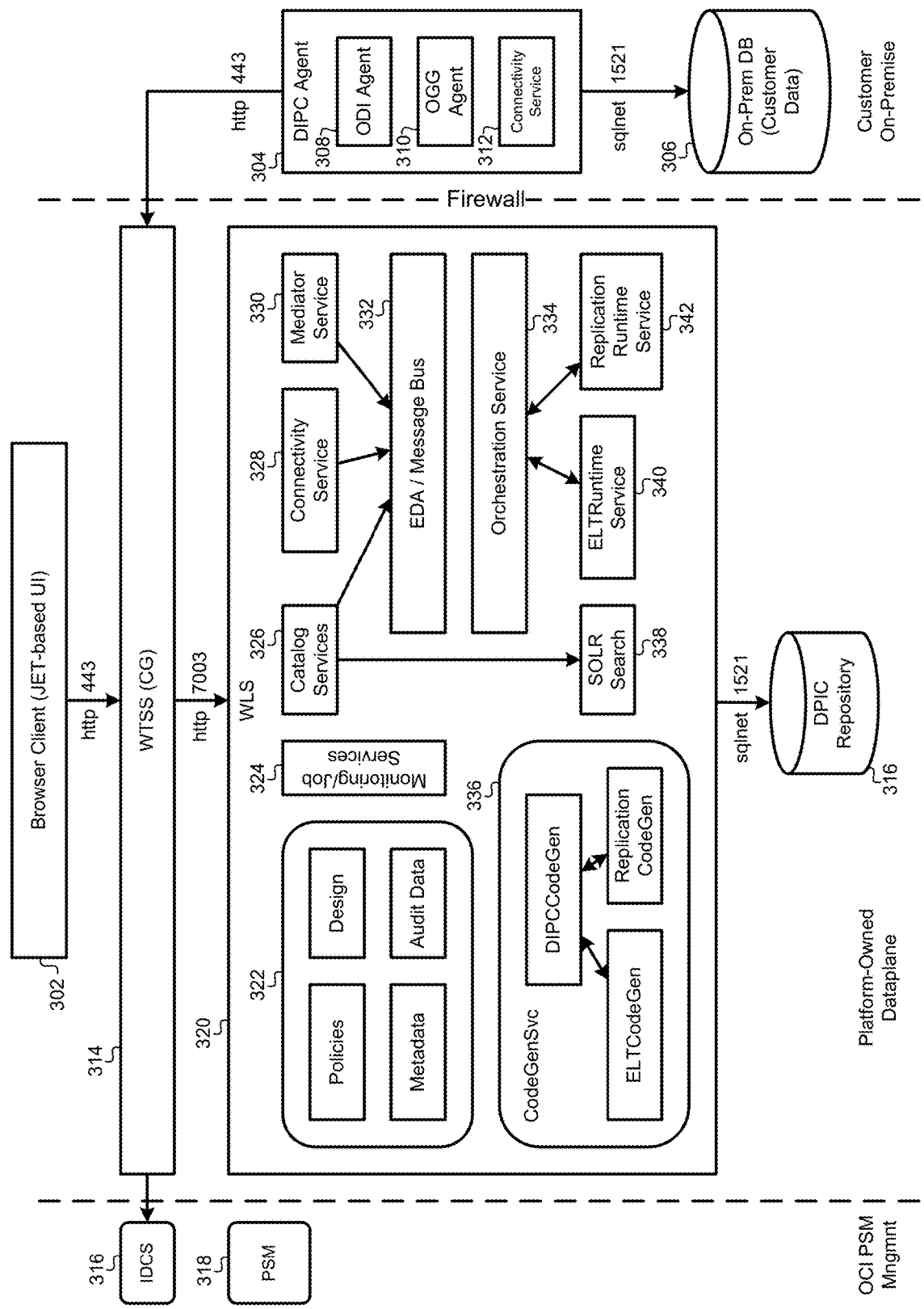
FIG. 3 is an illustrative architectural diagram of an Data Integration Platform Cloud (DIPC), in accordance with one or more embodiments of the present invention.

Referring now to FIG. 3, an illustrative architectural diagram is shown of a DIPC in accordance with certain embodiments of the disclosure. Requests may be received through a browser client 302, which may be implemented using a JavaScript Extension Toolkit (JET) set of components. Alternatively or additionally, the system may receive requests through a DIPC agent 304 that operates at a customer's on-premises data center 306. The DIPC agent 304 may include a data integrator agent 308 and an agent 310 for a replication service, such as Oracle's GoldenGate® service. Each of these agents 308, 310 may retrieve information from the on-premises data center 306 during normal operations and transmit data using a connectivity service 312 back to the DIPC.

Incoming requests can be passed through a sign-in service 314, which may include load-balancing or other utilities for routing requests through the DIPC. The sign-in service 314 may use an identity management service, such as an identity cloud service 316 to provide security and identity management for the cloud platform as part of an integrated enterprise security fabric. The identity cloud service 316 can manage user identities for both the cloud deployments and the on-premises applications described in this embodiment. In addition to the identity cloud service 316, the DIPC may also use a PaaS Service Manager (PSM) tool 318 to provide an interface to manage the lifecycle of the platform service in the cloud deployment. For example, the PSM tool 318 can be used to create and manage instances of the data integration service in the cloud platform.

The DIPC can be implemented on a Web logic server 320 for building and deploying enterprise applications in the cloud environment. The DIPC may include a local repository 322 that stores data policies, design information, metadata, and audit data for information passing through the DIPC. It may also include a monitoring service 324 to populate the local repository 322. A catalog service 326 may include a collection of machine-readable open APIs to provide access to many of the SaaS and PaaS applications in the cloud deployment. The catalog service 326 may also be available for a search application 338 that uses a distributed indexing service, such as the Apache Solr®. A connectivity service 328 and a mediator service 330 can manage connections and provide transformation, validation, and routing logic for information that passes through the DIPC. Information within the DIPC may be passed using an Event Driven Architecture (EDA) and a corresponding message bus 332.

The DIPC may also include an orchestration service 334. The orchestration service 334 may enable automation tasks by calling REST endpoints, scripts, third-party automation frameworks, and so forth. These tasks can then be executed by the orchestration service 334 to provide the DIPC functionality. The orchestration service 334 can use run-time services to import, transform, and store data. For example, an ELT runtime service 334 can execute the library of ELT functions described above, while the replication runtime service 342 can copy data from various data sources into a cloud-deployed DIPC repository 316. Additionally, the DIPC may include a code generation service 336 that provides automatic code generation for both ELT functions and replication functions.

As noted above, data replication and other data transmission processes (e.g., data caching, mirroring, various data distribution systems, etc.) may be time-consuming and resource-intensive processes, and it may not be possible or efficient in some computing environments to replicate entire databases from a source system to a target system in some situations. For example, when considering a possible replication of a single database from a source system to a target system, several factors may make the database replication impossible or undesirable to the operation of the computing system as a whole. For example, there may be insufficient storage space on the target system to copy the entire database, the efficiencies in network access and/or speed caused by the replication may be more than offset by the processing and storage costs of performing the replications on a large database, and so on.

Therefore, certain aspects described herein relate to performing data replication processes and/or other data transfers, based on data access metrics. For example, embodiments described herein include determining a data access score for particular data objects (e.g., tables, columns, indexes, etc.) within a database or over multiple databases. Based on the data access scores of various database tables, columns, and/or other data objects, a replication system may determine particular subsets of the tables/columns/etc. to be replicated. In some embodiments described herein, a replication system may retrieve and/or determine table access data for a plurality of tables within one or more databases, for example, in response to a replication request. In some cases, the table access data may be determined based on the query logs of the database system, which may indicate which queries have been executed within the source database system over a previous time period. Using the query log data, the replication system may analyze the queries and determine which database tables were accessed, or were potentially accessed, during the execution of the queries. This table access data may be aggregated over the previously executed queries, to create the aggregated table access data for each table. A specific subset of the database tables then may be selected for replication (and/or transfer, distribution, migration, etc.), based on the table access data.

Figure 4:
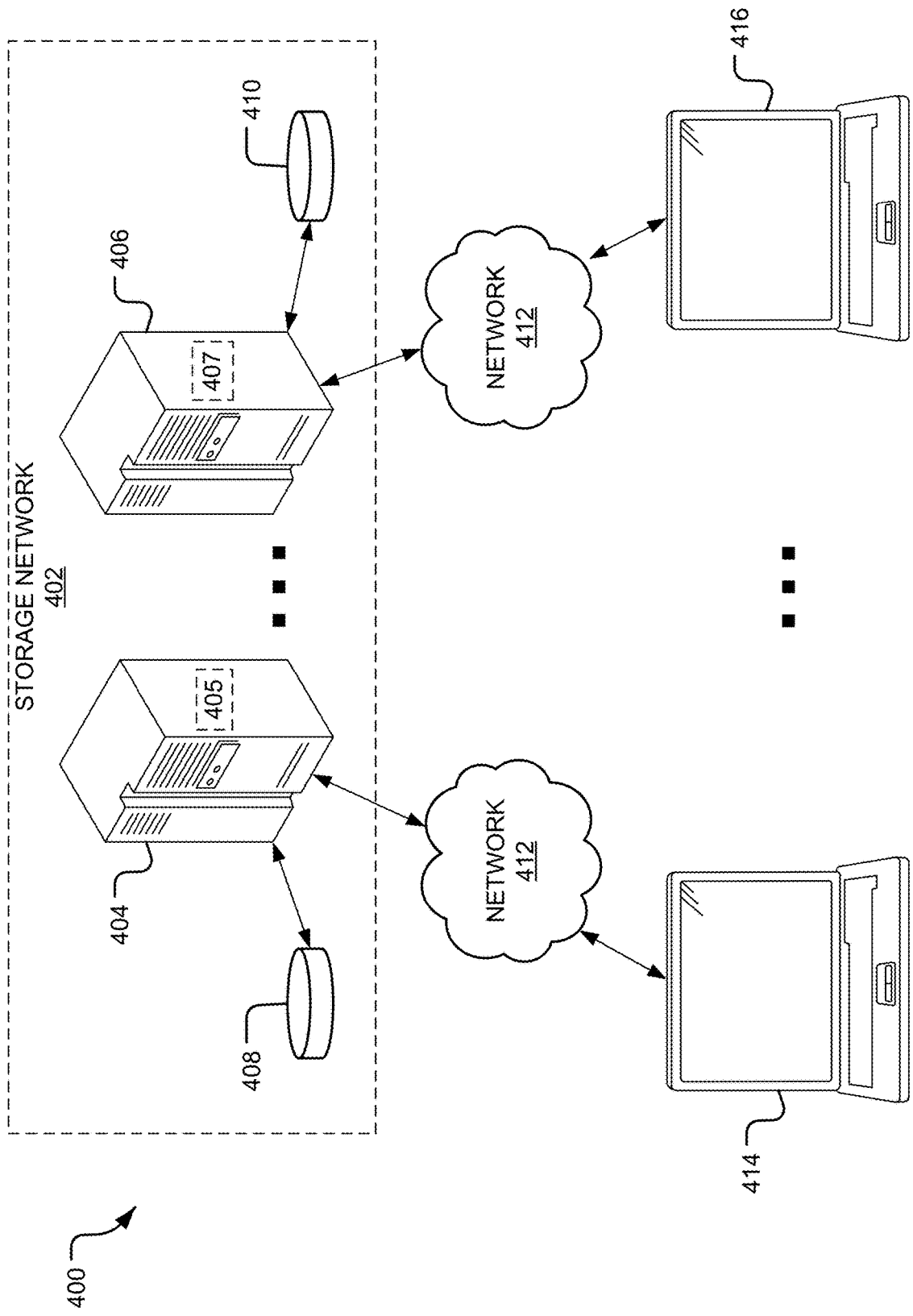
FIG. 4 a block diagram is shown illustrating various components of an example storage system, in accordance with one or more embodiments of the present invention.

With reference now to FIG. 4, a block diagram is shown illustrating various components of an example storage system 400 having one or more storage servers interconnected with one or more user devices over a network, the storage network supporting replication between the storage servers and/or the user devices. From the description above, it will be appreciated that aspects of the present disclosure may be used to increase overall system performance and conserve system resources, by replicating only the portions of a data storage that are the most accessed based on previous query data, and thus the most likely to be valuable to the target storage system in the replication. Aspects of the present disclosure apply to various computing devices including, without limitation, storage appliances, computers, and other storage devices or computing devices configured to replicate data. For example, various implementations describe systems and methods of replication between a first storage appliance (e.g., database server) and a second storage appliance (e.g., database server), or a single storage appliance and an archiving system, a single storage device and a user device, etc.

As shown in FIG. 4, an example storage system 400 may include a storage network 402 including one or more storage appliances (or servers) 404-406 including storage media 408-410. Generally, the database servers 404-406 may manage the storage of data on the storage media 408-410, which may involve spinning media (e.g., disc drives) as well as various forms of persistent memory, such as solid state memory. The database servers 404-406 may be cloud-based storage systems and/or any conventional storage appliance. Although not shown in detail in FIG. 4, so as not to obscure the other components shown herein, each database server 404-406 (which may be other types of devices/storage media in other embodiments), may store and execute a software-based replication engine 405 and 407 to perform the source and target data replication functionality between the servers. Replication engines 405 and 407 may include, for example, interface software layers to receive commands from user devices 414 and 416, one or more APIs, network communication layers (e.g., TCP/IP interfaces), and data transformation engines.

As shown in this example, the storage system 400 may include a client network having one or more user devices 414-416. The storage network 402 may be accessible by the client network using one or more computer networks 412. It will be appreciated, however, that the various networks may comprise an integrated network, and the connections between the networks represent but one possible network topology. The various networks may also be local in nature or geographically dispersed, such as with large private enterprise networks or the Internet. The user devices 414-416 are generally any form of computing device capable of interacting with the network 412, such as a terminal, a workstation, a personal computer, a portable computer, a cellphone, a mobile device, a tablet, a multimedia console, and the like. In some implementations, the network 412 includes one or more user interfaces, including, for example, a browser user interface (BUI), permitting a client to interact with the storage network 402 to access data.

In various implementations, any portions of the overall system 400 may be implemented using one or more computing systems and/or networks. Such computing systems may include one or more computers and/or servers, which may be general purpose computers, specialized server computers (such as desktop servers, UNIX servers, mid-range servers, mainframe computers, rack-mounted servers, etc.), server farms, server clusters, distributed servers, or any other appropriate arrangement and/or combination of computing hardware. One or more data replication engines running within the servers 404 and 406 (or other storage devices) may run operating systems and/or a variety of additional server applications and/or mid-tier applications, including HyperText Transport Protocol (HTTP) servers, File Transport Service (FTP) servers, Common Gateway Interface (CGI) servers, Java servers, database servers, and other computing systems. Each component in system 400 may be implemented using hardware, firmware, software, or combinations of hardware, firmware, and software.

In various implementations, each component within system 400 may include at least one memory, one or more processing units (e.g., processor(s)), and/or storage. The processing unit(s) can be implemented as appropriate in hardware (e.g., integrated circuits), computer-executable instructions, firmware, or combinations of hardware and instructions. In some examples, the various components of system 400 may include several subsystems and/or modules. The subsystems and/or modules storage network 402 may be implemented in hardware, software (e.g., program code or instructions executable by a processor) executing on hardware, or combinations thereof. In some examples, the software may be stored in a memory (e.g., a non-transitory computer-readable medium), on a memory device, or some other physical memory, and may be executed by one or more processing units (e.g., one or more processors, one or more processor cores, one or more Graphics Process Units (GPUs), etc.). Computer-executable instructions or firmware implementations of the processing unit(s) can include computer-executable or machine-executable instructions written in any suitable programming language, which can perform the various operations, functions, methods, and/or processes described herein. The memory may store program instructions that are loadable and executable on the processing unit(s), as well as data generated during the execution of these programs. The memory may be volatile (such as random access memory (RAM)) and/or non-volatile (such as read-only memory (ROM), flash memory, etc.). The memory may be implemented using any type of persistent storage device, such as computer readable storage media. In some examples, computer-readable storage media may be configured to protect a computer from an electronic communication containing malicious code. The computer-readable storage media may include instructions stored thereon, that when executed on a processor, perform operations of the security monitoring and control system 102.

In various embodiments, the database servers 404-406 and/or storage media 408-410 may correspond to cloud storage systems, and other infrastructure components such as web caches, network components, etc. (not shown in this example), may include various hardware and/or software components (e.g., application programming interfaces (APIs), cloud resource managers, etc.) to provide and monitor the replication of databases, tables, and other data objects, as well as to manage the underlying storage/server/network resources. The underlying resources of the databases 404-406 may include, for example, a set of non-volatile computer memory devices implemented as databases, file-based storage, etc., a set of network hardware and software components (e.g., routers, firewalls, gateways, load balancers, etc.), a set of host servers, and various software resources such as, store software images, installations, builds, templates, configuration files, and the like, corresponding to different versions of various platform, server, middleware, and application software. The datacenters housing the application servers associated with database servers 404-406 and related services/components also may include additional resources such as hypervisors, host operating systems, resource managers and other cloud-based applications, along with the hardware and software infrastructure to support various Internet-based services, such as Infrastructure as a Service (IaaS), Platform as a Service (PaaS), and Software as a Service (SaaS). Additionally, the underlying hardware of the datacenters may be configured to support a number of internal shared services, which may include, for example, security and identity services, integration services, repository services, enterprise management services, virus scanning services, backup and recovery services, notification services, file transfer services, and the like.

As noted above, many different types of computer architectures (cloud-based, web-based, hosting, multi-tier computing environments, distributed computing environments, etc.) may be used to provide the data analysis and data replication and/or other data transfer functionality within servers 404-406, based on interactions with user devices 414-416, in accordance with various embodiments described herein. However, in certain implementations, cloud computing platforms may be used to provide certain advantageous features for data replication and other data transfers based on table access data. For example, cloud computing platforms may provide elasticity and scalability to quickly provision, configure, and deploy storage resources within the target/destination location 406, in contrast to non-cloud based implementations having fixed architectures and limited hardware resources. Moreover, public cloud, private cloud, and public-private hybrid cloud platforms may be used in various embodiments to leverage the features and advantages of each distinct architecture.

In some embodiments, the storage system 402 may utilize a storage pool layer having one or more storage pools comprising virtual devices constructed of block devices, such as the storage media 408-410. A block device may reference to any device that moves data in the form of blocks, which may be, without limitation, hard disk drives, solid state drives, optical drives, magnetic drives, and other addressable regions of memory. A virtual device may span a number of block devices or volumes, and a storage pool may include one or more virtual devices, each including one or more partitions of storage media or one or more storage media.

Data traffic to and from the storage appliances 404, 406 is typically managed by one or more dedicated storage servers located within the storage appliance 404, 406 or the storage network 402. Storage servers 404, 406 also may maintains one or more logs identifying current operations being performed by the client network, as well as previous data queries executed and data operations performed.

Data replication may allow for a first data storage (e.g., a source database within server 404) to create a replica of itself or a portion of itself on another system (e.g., a target database within server 406) by utilizing snapshots. For example, a snapshot may include an image of a source database 404, or a portion thereof, that may be used to create or recreate the state of the source database 404 within the target server 406. In some cases, a snapshot may be a read-only copy of a database or multiple databases on the source storage server 404 or other storage device that includes information needed to reproduce the database(s) at the time of the snapshot. Using the snapshots, the user devices 414-416 may discard a latest change causing a problem and revert to an earlier functional state.

In some implementations, a source storage server 404 may be configured to regularly create snapshots and transfer those snapshots to the target storage server 406 for replication. The regular generation and transfer of the snapshots provides relative synchronization between the storage appliances 404, 406 similar to a distributed replicated block device (DRBD) which mirrors a whole block device via an assigned network.

During replication, send/receive commands may be exchanged between the source storage server 404 and the target storage server 406. Snapshots of the various databases, tables, and other data objects on the source server 404 may be generated and transferred to the target server 406. The data stored on the source server 404 corresponding to the snapshot then may be transferred block by block to the target server 406. Often, the transfer of all the data blocks from the source server 404 to the target server 406 is a time and data intensive process, particularly where the source storage appliance 404 hosts large amounts of data (e.g., large databases, file systems, and/or other objects).

In some replication implementations, the snapshots and corresponding data are sent via a send stream, which is the sequence of bytes generated by a source system, pool, or dataset (e.g., the source database server 404) and received by a target system, pool, or dataset (e.g., the target database server 406). Replication may be based on a send command to generate the send stream from the source dataset hierarchy and a receive command to create or update a target dataset hierarchy from the send stream to keep a target package on the target database 106 up to date with the contents of a source project on the source database 404.

In such examples, the data to be sent to the target server 406 may be divided into a series of streams referred to as simple streams. There are three types of simple streams: a full simple stream, an incremental simple stream, and a clone simple stream. The full simple stream contains the full contents of a single snapshot of a dataset, preserving no intermediate snapshots. A full simple stream may be generated from any dataset, whether standalone or clone. An incremental simple stream contains the changes in the contents from one snapshot to another snapshot and can be generated from any two snapshots belong to the same dataset or from a clone origin to a snapshot in that clone. A clone simple stream introduces a new clone.

Simple streams may be sent and received as a standalone unit or collectively as a compound stream. A compound stream is a combined stream that contains multiple simple streams and a table of contents and properties (TOC). Stated differently, a compound stream includes an initial TOC stream containing the table of contents and properties of the stream, followed by a sequence of sub streams, each of which is a simple stream, followed by a final END record. The TOC describes the datasets and snapshots in a stream or in the source database server 404 as a whole, with their associated properties and shares.

Send streams may include an on-the-wire format having per-record checksums to detect data degradation in the stream. For various reasons, including, without limitation, network outages, system outages or reboots, or a checksum error on the wire, the replication process may be interrupted. The per-record checksums ensure that if the receipt of a simple stream is interrupted, the data that was received before the interruption can be trusted to have been correctly received and thus, can be committed to disk.

In some embodiments, the storage network 402 may include a one-way traffic communication flow from the source database server 404 to the target database server 406 with a limited back-channel that is one-way from the target database server 406 to the source database server 406. The replication techniques described herein also may provide an unbroken chain of custody at all levels of the send/receive transfer, demonstrating that the replication is complete, reliable, and stable, thereby allowing for the resumption of send operations in the middle of a compound stream and in the middle of a single simple snapshot pair within that compound transfer. In other words, the chain of custody verifies that a complete transfer is performed from the source database server 404 to the target database server 406, leaving nothing out. The replication is resilient to dataset namespace changes that occur on the source database server 404 during the overall requested transfer and resumed transfer. Recoverable namespace changes may include, without limitation, a rename, destroy or promote of a dataset, or a rename or destroy of a non-replication snapshot. Any errors that make the requested transfer impossible to complete are detected quickly and trigger an alert or exit the send command with a fatal error.

Although the examples above, and other examples described herein, are discussed with reference to data replication, it should be understood that the concepts and techniques described herein may be applied to other non-replication transfers of data structures/objects between storage media and/or servers or devices, such as caching, mirroring, distributed data systems (cloud or non-cloud), data migration and archiving, and the like. As discussed in more detail below, the techniques and embodiments in this disclosure relate to determining the highest priority subsets of data for replication, from within a single database or multiple databases/storage systems. As further discussed below, the determination of the highest priority subsets may be useful not only for replication purposes, but also for data archiving, caching (local or edge caching), data migration, mirroring, etc. Thus, although entire databases or other large-scale storage systems (e.g., files or file systems, unstructured data, etc.) may be replicated in some embodiments, other embodiments described herein may involve determining access data for individual tables, columns, and other constituent components of a databases. Further, although the example in FIG. 4 illustrates data replication between a source database server 404 (and/or storage medium 408), and a target database server 406 (and/or storage media 410), the embodiments described herein may relate to other types of source/target systems as well. For instance, the techniques herein may apply to data replication (or other data transfers) between storage appliances and other storage appliances, database servers and other database servers, servers and file systems/client devices/mobile devices/etc., client devices and other client devices, and so on.

Figure 5:
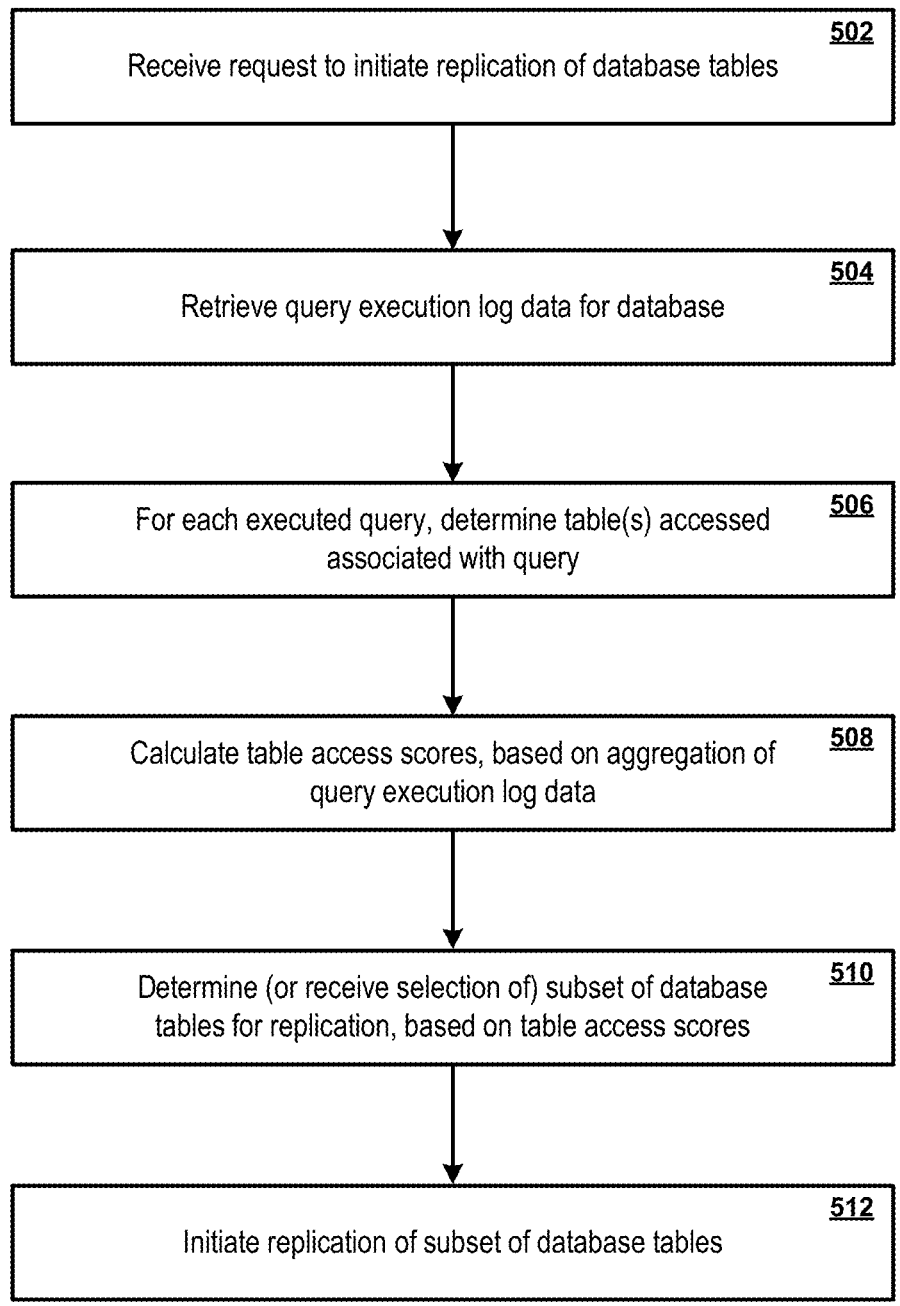
FIG. 5 is a flow diagram illustrating an example process of determining a subset of database objects to replicate, and initiating replicating of the subset of database objects from a source storage device to a target storage devices, in accordance with certain embodiments of the present invention.

Referring now to FIG. 5, a flowchart is shown illustrating a process of determining a subset of tables and/or other database objects for replication from a source physical storage device to a target physical storage device. As described below, the steps in this process may be performed by one or more components in system 400, such as replication engines 405 and 407 within the source and target database servers 404 and 406, in conjunction with user instructions received from user devices 414 and 416, and the various subsystems and subcomponents implemented therein. However, as noted above, the techniques disclosed here are not limited to data replication of database tables, but may also apply to other data transfer technologies (e.g., local or edge caching, mirroring, distributed storage systems, etc.), and to replication/transfer of other objects (e.g., subsets of databases with multi-database systems, subsets of columns within tables, subsets of file systems, and other data storage systems).

In step 502, a request is received by a software-based replication engine (e.g., 405 or 407) of a database server 404, 406, to replicate a number of a tables and/or other data objects from a source physical storage device (e.g., database server 404) to a target physical storage device (e.g., database server 406). In some examples, the request may be initiated by a user via a user device 414 or 416. In other examples, the request may be initiated automatically, for example, as part of a periodic replication syncing process performed by a replication engine 405 or 407, or a process automatically triggered by a change to the data within a source database 404. Additionally, as noted above, for some embodiments the request received in step 502 need not be a request to replicate data, but may alternatively be a request to update a data cache, migrate or re-distribute data, etc.

In step 504, in response to the database table replication request, the replication engine (e.g., 405) associated with the source database server 404 may retrieve one or more query execution logs of the source database server 404. Generally, the query execution log of a database server may store at least a listing of data indicating which queries have been executed on the database, including the query name, date/time of execution, the user (or process) that initiated the query execution, and other relevant data. In some examples, the query execution log(s) may include the V$SQL table of the database server 404. An example description of the data fields that may be found within the V$SQL table is shown below in Table 1. The V$SQL table lists statistics on shared SQL area without the GROUP BY clause and contains one row for each child of the original SQL text entered. Statistics displayed in V$SQL may be updated at the end of query execution. However, for long running queries, such statistics may be updated every N seconds (e.g., 1 second, 5 seconds, 10 seconds, etc.). This may allow retrievals/analyses of the data to see the impact of long running SQL statements while they are still in progress. In various embodiments, the data retrieved in step 504 may include each of these data fields, individually or in any combination.

TABLE 1

Example of V$SQL Query Log Table

| Column | Datatype | Description |
|---|---|---|
| SQL_TEXT | VARCHAR2(1000) | First thousand characters of the SQL text for the current cursor |
| SQL_FULLTEXT | CLOB | Full text for the SQL statement exposed as a CLOB column. The full text of a SQL statement can be retrieved using this column instead of joining with the V$SQL_TEXT dynamic performance view. |
| SQL_ID | VARCHAR2(13) | SQL identifier of the parent cursor in the library cache |
| SHARABLE_MEM | NUMBER | Amount of shared memory used by the child cursor (in bytes) |
| PERSISTENT_MEM | NUMBER | Fixed amount of memory used for the lifetime of the child cursor (in bytes) |
| RUNTIME_MEM | NUMBER | Fixed amount of memory required during the execution of the child cursor |
| SORTS | NUMBER | Number of sorts that were done for the child cursor |
| LOADED_VERSIONS | NUMBER | Indicates whether the context heap is loaded (1) or not (0) |
| OPEN_VERSIONS | NUMBER | Indicates whether the child cursor is locked (1) or not (0) |
| USERS_OPENING | NUMBER | Number of users executing the statement |
| FETCHES | NUMBER | Number of fetches associated with the SQL statement |
| EXECUTIONS | NUMBER | Number of executions that took place on this object since it was brought into the library cache |

TABLE 1-continued

Example of V$SQL Query Log Table

| Column | Datatype | Description |
| --- | --- | --- |
| PX_SERVERS_EXECUTIONS | NUMBER | Total number of executions performed by Parallel eXecution Servers. The value is 0 when the statement has never been executed in parallel. |
| END_OF_FETCH_COUNT | NUMBER | Number of times this cursor was fully executed since the cursor was brought into the library cache. The value of this statistic is not incremented when the cursor is partially executed, either because it failed during the execution or because only the first few rows produced by this cursor are fetched before the cursor is closed or re-executed. By definition, the value of the END_OF_FETCH_COUNT column should be less or equal to the value of the EXECUTIONS column. |
| USERS_EXECUTING | NUMBER | Number of users executing the statement |
| LOADS | NUMBER | Number of times the object was either loaded or reloaded |
| FIRST_LOAD_TIME | VARCHAR2(19) | Timestamp of the parent creation time |
| INVALIDATIONS | NUMBER | Number of times this child cursor has been invalidated |
| PARSE_CALLS | NUMBER | Number of parse calls for this child cursor |
| DISK_READS | NUMBER | Number of disk reads for this child cursor |
| DIRECT_WRITES | NUMBER | Number of direct writes for this child cursor |
| BUFFER_GETS | NUMBER | Number of buffer gets for this child cursor |
| APPLICATION_WAIT_TIME | NUMBER | Application wait time (in microseconds) |
| CONCURRENCY_WAIT_TIME | NUMBER | Concurrency wait time (in microseconds) |
| CLUSTER_WAIT_TIME | NUMBER | Cluster wait time (in microseconds) |
| USER_IO_WAIT_TIME | NUMBER | User I/O Wait Time (in microseconds) |
| PLSQL_EXEC_TIME | NUMBER | PL/SQL execution time (in microseconds) |
| JAVA_EXEC_TIME | NUMBER | Java execution time (in microseconds) |
| ROWS_PROCESSED | NUMBER | Total number of rows the parsed SQL statement returns |
| COMMAND_TYPE | NUMBER | Oracle command type definition |
| OPTIMIZER_MODE | VARCHAR2(10) | Mode under which the SQL statement is executed |
| OPTIMIZER_COST | NUMBER | Cost of this query given by the optimizer |
| OPTIMIZER_ENV | RAW(691) | Optimizer environment |
| OPTIMIZER_ENV_HASH_VALUE | NUMBER | Hash value for the optimizer environment |
| PARSING_USER_ID | NUMBER | User ID of the user who originally built this child cursor |
| PARSING_SCHEMA_ID | NUMBER | Schema ID that was used to originally build this child cursor |
| PARSING_SCHEMA_NAME | VARCHAR2(30) | Schema name that was used to originally build this child cursor |
| KEPT_VERSIONS | NUMBER | Indicates whether this child cursor has been marked to be kept pinned in the cache using the DBMS_SHARED_POOL package |
| ADDRESS | RAW(4 \| 8) | Address of the handle to the parent for this cursor |
| TYPE_CHK_HEAP | RAW(4) | Descriptor of the type check heap for this child cursor |
| HASH_VALUE | NUMBER | Hash value of the parent statement in the library cache |

TABLE 1-continued

Example of V$SQL Query Log Table

| Column | Datatype | Description |
| --- | --- | --- |
| OLD_HASH_VALUE | NUMBER | Old SQL hash value |
| PLAN_HASH_VALUE | NUMBER | Numerical representation of the SQL plan for this cursor. Comparing one PLAN_HASH_VALUE to another easily identifies whether or not two plans are the same (rather than comparing the two plans line by line). |
| CHILD_NUMBER | NUMBER | Number of this child cursor |
| SERVICE | VARCHAR2(64) | Service name |
| SERVICE_HASH | NUMBER | Hash value for the name listed in SERVICE |
| MODULE | VARCHAR2(64) | Contains the name of the module that was executing at the time that the SQL. statement was first parsed, which is set by calling DBMS_APPLICATION_INFO.SET_MODULE |
| MODULE_HASH | NUMBER | Hash value of the module listed in the MODULE column |
| ACTION | VARCHAR2(64) | Contains the name of the action that was executing at the time that the SQL statement was first parsed, which is set by calling DBMS_APPLICATION_INFO.SET_ACTION |
| ACTION_HASH | NUMBER | Hash value of the action listed in the ACTION column |
| SERIALIZABLE_ABORTS | NUMBER | Number of times the transaction fails to serialize, producing ORA-08177 errors, per cursor |
| OUTLINE_CATEGORY | VARCHAR2(64) | If an outline was applied during construction of the cursor, then this column displays the category of that outline. Otherwise the column is left blank. |
| CPU_TIME | NUMBER | CPU time (in microseconds) used by this cursor for parsing, executing, and fetching |
| ELAPSED_TIME | NUMBER | Elapsed time (in microseconds) used by this cursor for parsing, executing, and fetching |
| OUTLINE_SID | NUMBER | Outline session identifier |
| CHILD_ADDRESS | RAW(4 | 8) | Address of the child cursor |
| SQLTYPE | NUMBER | Denotes the version of the SQL language used for this statement |
| REMOTE | VARCHAR2(1) | Indicates whether the cursor is remote mapped (Y) or not (N) |
| OBJECT_STATUS | VARCHAR2(19) | Status of the cursor: VALID - Valid, authorized without errors VALID_AUTH_ERROR - Valid, authorized with authorization errors VALID_COMPILE_ERROR - Valid, authorized with compilation errors VALID_UNAUTH - Valid, unauthorized INVALID_UNAUTH - Invalid, unauthorized INVALID - Invalid, unauthorized but keep the timestamp |
| LITERAL_HASH_VALUE | NUMBER | Hash value of the literals which are replaced with system-generated bind variables and are to be matched, when CURSOR_SHARING is used This is not the hash value for the SQL statement. If CURSOR_SHARING is not used, then the value is 0. |
| LAST_LOAD_TIME | VARCHAR2(19) | Time at which the query plan (heap 6) was loaded into the library cache |
| IS_OBSOLETE | VARCHAR2(1) | Indicates whether the cursor has become obsolete (Y) or not (N). This can happen if the number of child cursors is too large. |
| CHILD_LATCH | NUMBER | Child latch number that is protecting the cursor |

TABLE 1-continued

Example of V$SQL Query Log Table

| Column | Datatype | Description |
| --- | --- | --- |
| SQL_PROFILE | VARCHAR2(64) | SQL profile |
| PROGRAM_ID | NUMBER | Program identifier |
| PROGRAM_LINE# | NUMBER | Program line number |
| EXACT_MATCHING_SIGNATURE | NUMBER | Signature calculated on the normalized SQL text. The normalization includes the removal of white space and the uppercasing of all non-literal strings. |
| FORCE_MATCHING_SIGNATURE | NUMBER | The signature used when the CURSOR_SHARING parameter is set to FORCE |
| LAST_ACTIVE_TIME | DATE | Time at which the query plan was last active |
| BIND_DATA | RAW(2000) | Bind data |

Different source database servers 404 may be managed (e.g., by a system administrator) to retain query execution data for different lengths of time. For example, different database servers 404 may retain query execution data within V$SQL tables (or other query logs) for an hour, day, week, month, or year, or any configurable length of time depending on the usage of the system and the preferences of the system administrator. Additionally, in some cases, even if longer-term query data is available for a source system 404, the replication engine 405 may determine that only the most recent query data should be used for determining access scores and replication determinations, and thus, the replication engine 405 may query only the more recent query data from the query logs kept by the source server 404. In still other examples, query data from a longer time period may be retrieved in step 254, but the more recent query data may be weighted more in the subsequent steps 506-508.

In step 506, after retrieving the query execution log data in step 504, the software components controlling the replication process (e.g., which may be replication engines on the source or target server 405 or 407, or a separate replication component on a user device 414 or 416, or within a separate third-party system), may analyze the query log data to determine the particular databases tables accessed associated with each of the queries in the log. In some examples, the replication engine 405 of a source database server 404 may retrieve and parse the full SQL statements for each of the executed queries retrieved in step 504. By parsing the full SQL of each query, the replication engine 405 may determine the table names of each table referenced by the query. The SQL queries may range from simple SQL statements up to large and complex SQL-based procedures with many lines of code, logical branches, and sub-queries. Thus, it may be determined for each individual query analyzed in step 506, that multiple different data tables may have been accessed (or potentially accessed), and in some cases a single table may be accessed multiple times in a query. The software in step 506 may therefore track and record each table accessed by each query (or potentially accessed), the number of times that each table was accessed, and/or additional access characteristics such as the type of access/operation (e.g., data read, data create, data write, metadata retrieval or updating, etc.), and the user and/or authorization level associated with the table access.

The access data determined in step 506 is not limited to database tables, but in various embodiments may include other database objects which may be replicated and/or transferred to target systems, including views, indexes, functions/procedures, user profiles, etc. With respect to views and other readable objects (e.g., sequences, queues, etc.), because a SQL Parser (e.g., a JSqlParser) may be used, it may return the list of things in SELECT statements that appear in the place of tables, so these views and other objects may be counted. Further, as noted above, in some cases, the replication engine 405 may be configured to determine access data (e.g., access scores/popularity scores) not just for tables, but also for individual columns within tables. As discussed in more detail below, in some embodiments, individual columns may be replicated or transferred based on high access scores for those columns, while other columns in the same tables might not be replicated/transferred based on lower access scores for those columns.

In step 506, when analyzing the full text SQL of an executed query, it is possible for the analysis to identify database tables are found within the full text SQL but that might or might not have actually been accessed during the execution of the query. For example, a query may execute logic where depending on the current value of a variable or combination of variables, different sets of tables may be accessed. In certain embodiments, the software components of the replication engine 405 may include all of these potentially accessed tables within the access data collected in step 206. Additionally or alternatively, the replication engine 405 may retrieve data from separate data sources (e.g., the data access logs for the database), or may re-execute portions of the query, in order to attempt to determine which tables actually were accessed.

In step 508, the replication engine 405 may calculate table access metrics for the tables within the source database 404, based on the analysis of the query execution log data in step 406. In some embodiments, a table access metric (or access score for a table) may correspond to the total number of times the table was (actually or potentially) accessed during the execution of the queries within the retrieved query logs. For example, if 100 different query executions were analyzed in step 506, it may be determined that Table A was accessed 218 times total during the 100 query executions, and that Table B was accessed 54 times during the 100 query executions. Thus, in this example, Table A may have an access score of 218 and Table B may have an access score of 54. Additionally or alternatively, the access scores calculated in step 508 may correspond to the percentage of queries executed that access the table at least once. Using this metric for a table access score, and continuing with the same previous query execution data, it may be determined that Table A was accessed a total of 218 times, but was only accessed by 24 of the 100 queries to be executed, whereas Table B was accessed a total of 54 times, by 37 different queries. Thus, using a percentage of queries accessed metric, Table A would have an access score of 24 in this example, and Table B would have an access score of 37.

Although table access metrics/scores are illustrated in this example, similar techniques may be used to calculate access scores for individual table columns. For example, one or more particular columns within Table A may have "percentage of queries accessed" access scores of 24, while other columns within Table A may have lower access scores (including access scores of zero for columns not accessed). Additionally, in certain embodiments, similar analyses/calculations may be used to determine object access scores for other types of database objects, including databases, clusters, indexes, user profiles, procedures, libraries, classes, database logs, etc. Additionally, in some cases, the access scores in step 508 may be calculated for particular types of access only (e.g., a table read access score, a table modify access score, a table add new data access score, and so on). In further examples, table access scores (and other data access metrics) may be calculated based on the queries initiated only by certain users or subsets of users. For example, a single table may have one access score associated with a first user, group, or role (e.g., based on the queries initiated by the first user/group/role), and a different second access score associated with a second user, group, or role (e.g., based on the different set of queries initiated by the second user/group/role).

As noted above, the calculation of data access metrics (e.g., a table access score) in step 508 may be based on the number of times that the table was accessed (or potentially accessed) during the execution of the set of queries in one or more query logs. Additionally, in some embodiments, the calculation of such access scores may including weighting scores in favor of more recent data access. For instance, if two different tables have the same numbers or percentages of data access based on a set of query logs, but the first table was accessed more by the most recent queries, and the second table was accessed more by older queries, then the recency of the queries may be rated to give the first table a higher access score. Additionally or alternatively, access scores may be weighted based on certainty of access. For example, if it can be determined based on the full text of a SQL query, that a first table was definitely accessed during the execution of the query, and a second table was potentially accessed during the execution of the query (e.g., conditionally accessed based on a variable), then the certainty of the table access queries may be weighted to give the first table a higher access score than the second table for this query.

As noted above, in some cases a replication system/engine may determine that a particular table or other database object was (and/or always will be) definitely accessed when a particular query is executed, while in other cases the replication system/engine may determine that a particular object was not definitely accessed but potentially may have been accessed when the query was executed. For example, the full text SQL of the query may be parsed and analyzed to determine whether a referenced table or other object will always be accessed, or instead may be optionally or conditionally accessed when the query is executed. To illustrate, in a first example query statement: "Return Table1.Column_A.Value1," it can be determined definitively by analyzing the query text that Table1 (and in particular, Column_A of Table1) will be accessed every time this query is executed. However, in a second example query statement "If Table1.Column_A.Value1>Variable, Then return Table2.Column_B.Value2, Else return 0," it cannot be determined definitively from the query text alone whether or not Table2 will be accessed when the second query is executed. Thus, in these examples, the replication engine may identify Table1 (and Column_A of Table 1) as being associated with both the first and second query, and being "definitively" accessed whenever either of these queries is executed. In contrast, the replication engine may identify Table2 as being associated with the second query but being only "potentially" accessed whenever the second query is executed. In some embodiments, if a table or other database object is identified as being only "potentially" accessed by the query (e.g., optional or conditional access based on the analysis of the query text), then the replication engine may further analyze the particular conditions of the query and/or the state of the data, to determine whether or not that object was in fact accessed at the time(s) that that query was executed. As noted above, the replication engine may assign different weights to data objects based whether or not they are potentially or definitely accessed (and/or based on the probability of actually accessing the object when the object only potentially accessed).

In some embodiments, other techniques may be used alternatively to or in conjunction with analysis of the query text, to determine whether or not the execution of a query resulted in the accessing of particular tables or other database objects. For instance, network monitoring and/or data access logs operating on the database level, operating system and/or hardware layers may be used to determine which database objects are accessed (and how often) when each query in the query log is executed.

In step 510, using the table access scores determined in step 508, the system 400 may determine a subset of database tables to be replicated from the source database server 404 to the target database server 406. As with the steps above, step 510 may be performed by the replication engine(s) 405, 407 of the source and/or target servers 404, 406, by a user device 414 or 416, or by a separate system. In some embodiments, the determination of the tables to be replicated in step 510 may include receiving user input from a user device 414 or 416 selecting the specific tables to be replicated.

Figure 6:
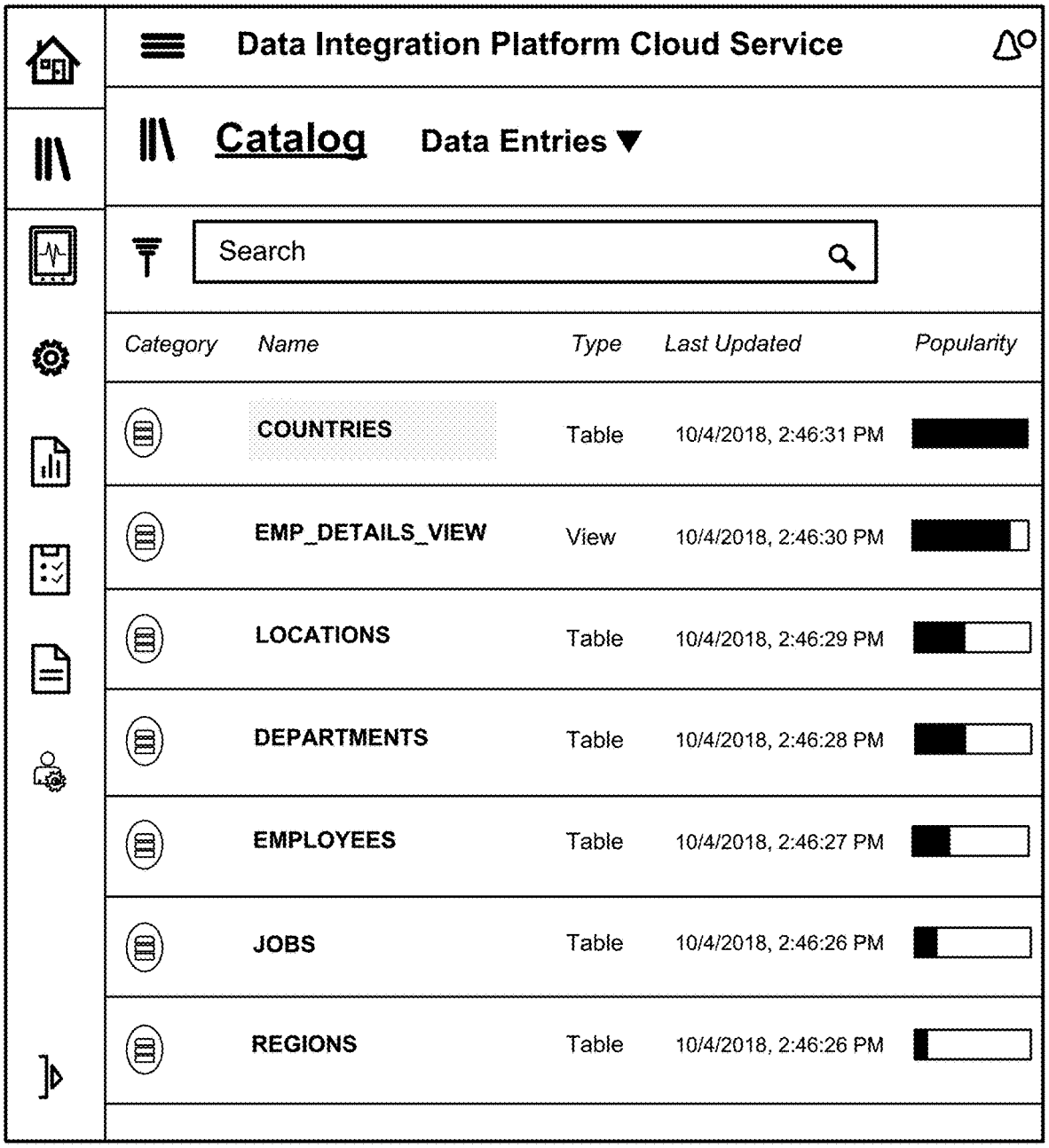
FIG. 6 is an example screen of a user interface displaying data object access metrics, in accordance with certain embodiments of the present invention.

For example, as shown in FIG. 6, the replication system may generate and transmit a user interface to a user device 414 or 416, identifying a number of tables that may be selected for replication, along with the table access score (or popularity score) of each table. In these examples, the user may review the table access scores, last modified dates, and other table characteristics, and then use the user interface to select particular tables to be replicated to the target server 404. Each table/view in FIG. 6 includes a bar graph to reflect the table access score/popularity data for the particular table/view, and in this case the listing has been sorted based on access score/popularity. The access score/popularity in this example may correspond to the percentage of executed queries within the query log that involve accessing (or potentially accessing) the table, although this graphic may be changed to reflect any of the other types of access scores and criteria discussed above. Additionally, although the user interface in FIG. 6 only shows tables and views as selectable for replication, in other examples, a user interface may allow users to select specific columns of tables, and/or other types of database objects. In certain embodiments, the user interface in FIG. 6 also may include tables, views, columns, and/or other objects from across the multiple different databases of the source server 404.

In other embodiments, step 510 need not involve receiving user input from a user device 414 or 416 to select specific tables/objects to be replicated. Rather, the determination of specific tables/objects may be performed by an automated software component (e.g., within replication engine 405 and/or 407), that algorithmically selects the subset of database tables and/or other objects to be replicated. For example, an automated process may automatically select the N tables (or other database objects) with the highest access scores to be replicated, where the number of tables (N) to be replicated is determined based on the amount of available storage space within the target server 406. In some examples, the automated process may select specific table columns within tables to be replicated, based on higher access scores for those specific columns.

Additionally, in some cases, rather than selecting the N tables with the highest access scores, the automated process may be configured to maximize the number/percentage of query requests that can be served by the replicated tables. For instance, the automated table selection process may determine that more queries can be served remotely by replicating the first, third, and fourth tables (in the rank order of access scores), rather than the first and second tables. This may be, for example, because the second table is relatively large compared to the third and fourth tables, and/or because the first and fourth tables are generally accessed via the same queries, etc.

Further, while the selection of subsets of tables (or other database objects) to replicate in step 510 may be made automatically and transparently to the user, it should be understood that periodic recalculations and modifications to the replication scheme may be made automatically and transparently as well. Thus, during the normal operation of a replication-based system, the source server 404 and/or target server 406 may initiate periodic recalculations of the access scores for the source tables, and then may update the replication based on the recalculated scores. This process may change on-the-fly which tables from the source server 404 are replicated at the target server 406, and may be performed entirely automatically and transparently to the user. Metadata harvesting also may be used in some embodiments to determine updates to access scores for tables and other data objects. For example, auto invocation may be performed in response to a connection being created, so that the access score is determined in the background following the completion of metadata harvesting. Additionally, a REST end-point may be provided for explicit invocation of an access scoring process for a connection.

Finally, in step 512, the data transfer/replication process is initiated to replicate the set of tables (or other data object) determined/selected in step 510, from the source server 404 to one or more target servers 406. These steps may be performed via the software-based replication engines 405 and 407 within the database servers 404 and 406. In some examples, some or all of the features of steps 502-510 may be performed at the user devices 414 and 416 and/or a separate system within the server 404, 406, or a separate third-party system. Then, after the set of database tables to be replicated is determined, the set of tables may be provided to the replication engines 405 and 407 to perform the replication/data transfers.

Figure 7:
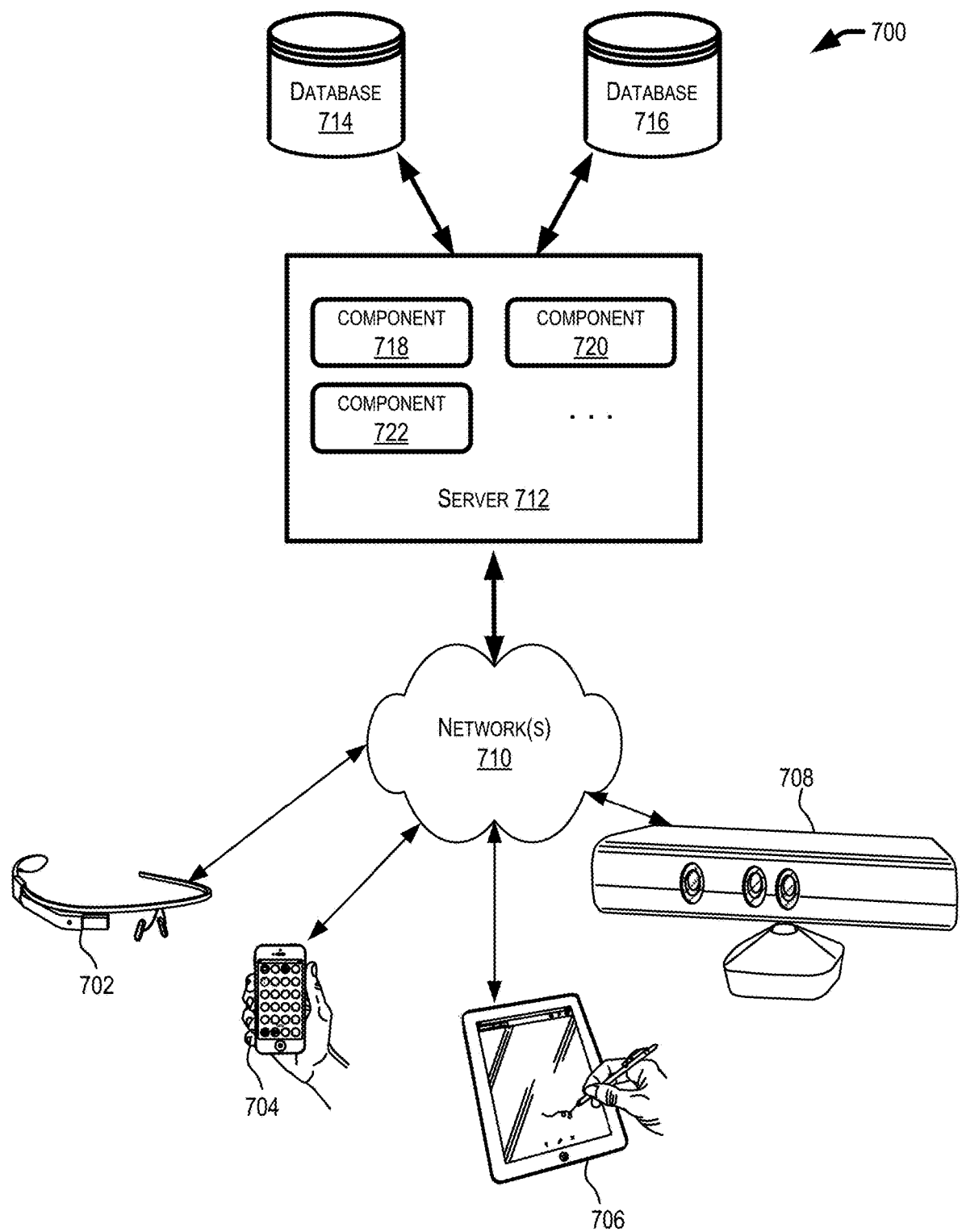
FIG. 7 is a diagram of computer server and computing environment, in accordance with certain embodiments of the present invention.

Referring now to FIG. 7, a simplified diagram is depicted of a distributed system 700 in which the various examples discussed above can be implemented. In the illustrated example, the distributed system 700 includes one or more client computing devices 702, 704, 706, 708, coupled to a server 712 via one or more communication networks 710. The client computing devices 702, 704, 706, 708 may be configured to run one or more applications.

In various embodiments, storage network 712 may be adapted to run one or more services or software applications that enable one or more operations associated with the system 100. For example, users may use the client computing devices 702, 704, 706, 708 (e.g., corresponding to content author device 710) to access one or more cloud-based services provided by via the replication system 700.

In certain examples, the server 712 may also provide other services or software application, and can include non-virtual and virtual environments. In some examples, these services may be offered as web-based or cloud services or under a Software as a Service (SaaS) model to the users of the client computing devices 702, 704, 706, 708. Users operating the client computing devices 702, 704, 706, 708 may in turn use one or more client applications to interact with the server 712 to use the services provided by these components.

In the configuration depicted in FIG. 7, the server 712 may include one or more components 718, 720, 722 that implement the functions performed by the server 712. These components may include software components that may be executed by one or more processors, hardware components, or combinations thereof. It should be appreciated that various different system configurations are possible, which may be different from the example distributed system 700.

The client computing devices 702, 704, 706, 708 may include various types of computing systems, such as portable handheld devices such as smartphones and tablets; general purpose computers such as personal computers and laptops; workstation computers; wearable devices such as a head-mounted display; gaming systems such as handheld gaming devices, gaming consoles, and Internet-enabled gaming devices; thin clients; various messaging devices; sensors and other sensing devices; and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). The client devices may be capable of executing various different applications such as various Internet-related apps, communication applications (e.g., e-mail applications, short message service (SMS) applications) and may use various communication protocols. A client device may provide an interface that enables a user of the client device to interact with the client device. The client device may also output information to the user via this interface. Although FIG. 7 depicts only four client computing devices, any number of client computing devices may be supported.

Network(s) 710 in the distributed system 700 may be any type of network familiar to those skilled in the art that can support data communications using any of a variety of available protocols, including without limitation TCP/IP (transmission control protocol/Internet protocol), SNA (systems network architecture), IPX (Internet packet exchange), AppleTalk, and the like. Merely by way of example, the network(s) 710 can be a local area network (LAN), networks based on Ethernet, Token-Ring, a wide-area network, the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol), and/or any combination of these and/or other networks.

The server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. The server 712 can include one or more virtual machines running virtual operating systems, or other computing architectures involving virtualization, such as one or more flexible pools of logical storage devices that can be virtualized to maintain virtual storage devices for the server. In various examples, the server 712 may be adapted to run one or more services or software applications that perform the operations as described above.

The server 712 may run an operating system including any of those discussed above, as well as any commercially available server operating system. The server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Examples of database servers include, without limitation, those commercially available from Oracle, Microsoft, Sybase, IBM (International Business Machines), and the like.

In some implementations, the server 712 may include one or more applications to analyze and consolidate data feeds and/or event updates received from users of the client computing devices 702, 704, 706, 708. As an example, data feeds and/or event updates may include, but are not limited to, Twitter® feeds, Facebook® updates or real-time updates received from one or more third-party information sources and continuous data streams, which may include real-time events related to sensor data applications, financial tickers, network performance measuring tools (e.g., network monitoring and traffic management applications), clickstream analysis tools, automobile traffic monitoring, and the like. The server 712 may also include one or more applications to display the data feeds and/or real-time events via one or more display devices of the client computing devices 702, 704, 706, 708.

The distributed system 700 may also include one or more data repositories 714, 716. These data repositories may provide a mechanism for storing information various types of information, such as the information described by the various examples discussed above. The data repositories 714, 716 may reside in a variety of locations. For example, a data repository used by the server 712 may be local to server 712 or may be remote from server 712 and in communication with server 712 via a network-based or dedicated connection. The data repositories 714, 716 may be of different types. In some examples, a data repository used by the server 712 may be a database, for example, a relational database, such as databases provided by Oracle Corporation® and other vendors. One or more of these databases may be adapted to enable storage, update, and retrieval of data to and from the database in response to SQL-formatted commands.

In some examples, one or more of the data repositories 714, 716 may also be used by applications to store application data. The data repositories used by applications may be of different types such as, for example, a key-value store repository, an object store repository, or a general storage repository supported by a file system.

Figure 8:
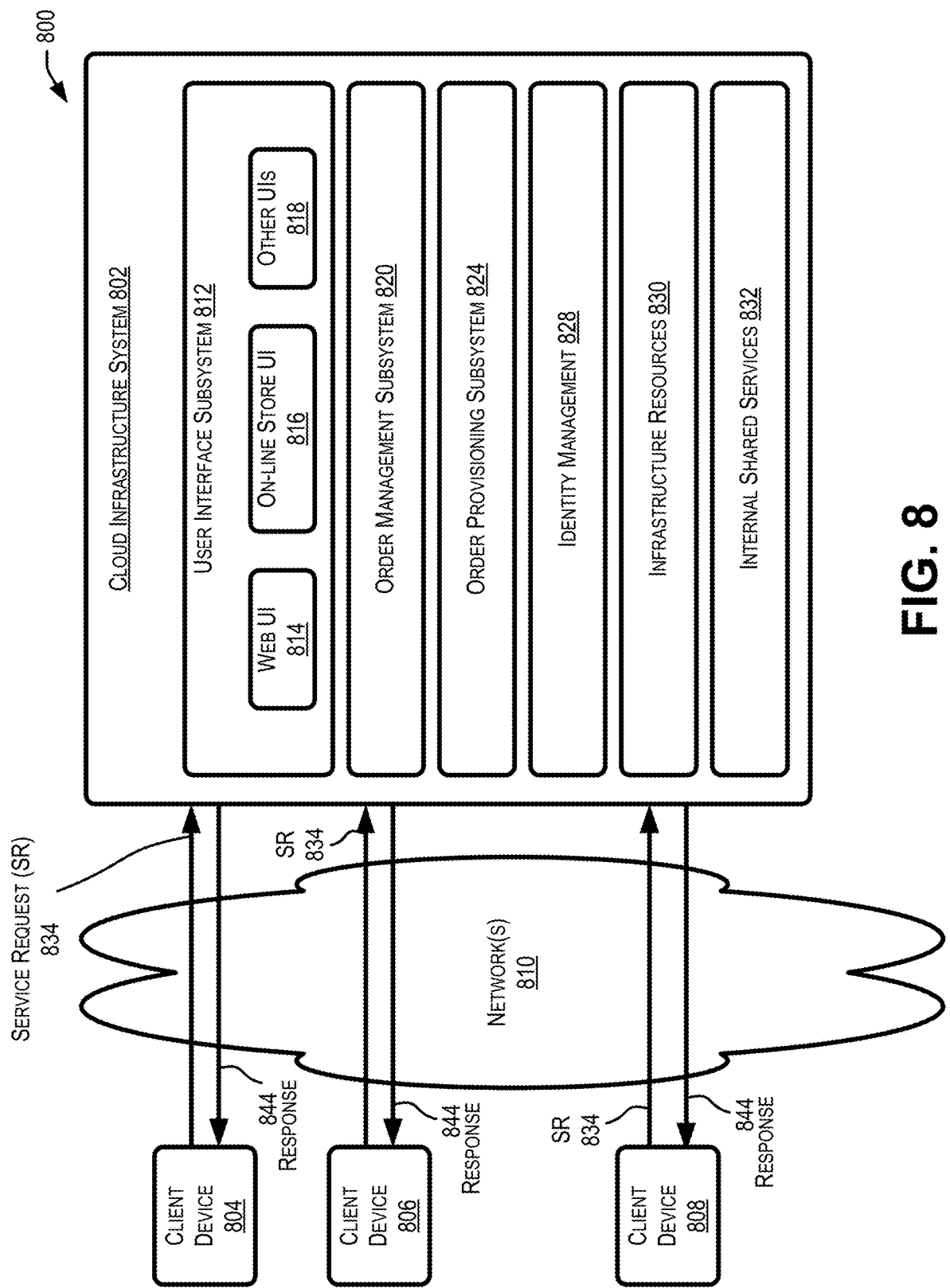
FIG. 8 is a simplified block diagram depicting components of a cloud computing system and environment, in accordance with certain embodiments of the present invention.

In some examples, a cloud environment may provide one or more services such as those discussed above. Referring now to FIG. 8, a simplified block diagram is shown of one or more components of a system environment 800 in which these and other services can be offered as cloud services. In the example illustrated in in FIG. 8, a cloud infrastructure system 802 may provide one or more cloud services that may be requested by users using one or more client computing devices 804, 806, and 808. The cloud infrastructure system 802 may include one or more computers and/or servers that may include those described above for server 712 of FIG. 7. The computers in cloud infrastructure system 802 of FIG. 8 may be organized as general purpose computers, specialized server computers, server farms, server clusters, or any other appropriate arrangement and/or combination.

Network(s) 810 may facilitate communication and exchange of data between the clients 804, 806, 808 and the cloud infrastructure system 802. The network(s) 810 may include one or more networks. The networks may be of the same or different types. The network(s) 810 may support one or more communication protocols, including wired and/or wireless protocols, for facilitating the communications.

The example depicted in FIG. 8 is only one example of a cloud infrastructure system and is not intended to be limiting. It should be appreciated that, in other examples, the cloud infrastructure system 802 may have more or fewer components than those depicted in FIG. 8, may combine two or more components, or may have a different configuration or arrangement of components. For example, although FIG. 8 depicts three client computing devices, any number of client computing devices may be supported in other examples.

The term cloud service is generally used to refer to a service that is made available to users on demand and via a communication network such as the Internet by systems (e.g., the cloud infrastructure system 802) of a service provider. Typically, in a public cloud environment, servers and systems that make up the cloud service provider's system are different from the customer's own on-premises servers and systems. The cloud service provider's systems are managed by the cloud service provider. Customers can thus avail themselves of cloud services provided by a cloud service provider without having to purchase separate licenses, support, or hardware and software resources for the services. For example, a cloud service provider's system may host an application, and a user may, via the Internet, on demand and self-service, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, Calif., such as middleware services, database services, Java cloud services, and others.

In various examples, the cloud infrastructure system 802 may provide one or more cloud services using different models, such as under a Software as a Service (SaaS) model, a Platform as a Service (PaaS) model, an Infrastructure as a Service (IaaS) model, and others, including hybrid service models. The cloud infrastructure system 802 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by the cloud infrastructure system 802. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

In some examples, resources in the cloud infrastructure system 802 may be shared by multiple users and dynamically re-allocated per demand. Additionally, resources may be allocated to users in different time zones. For example, the cloud infrastructure system 802 may enable a first set of users in a first time zone to utilize resources of the cloud infrastructure system for a specified number of hours and then enable the re-allocation of the same resources to another set of users located in a different time zone, thereby maximizing the utilization of resources.

The cloud infrastructure system 802 may provide the cloud services via different deployment models. In a public cloud model, the cloud infrastructure system 802 may be owned by a third party cloud services provider and the cloud services are offered to any general public customer, where the customer can be an individual or an enterprise. In certain other embodiments, under a private cloud model, the cloud infrastructure system 802 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other embodiments, under a community cloud model, the cloud infrastructure system 802 and the services provided may be shared by several organizations in a related community. Various other models such as hybrids of the above mentioned models may also be used.

The client computing devices 804, 806, 808 may be devices similar to those described above for the client computing devices 702, 704, 706, 708 of FIG. 7. The client computing devices 804, 806, 808 of FIG. 8 may be configured to operate a client application such as a web browser, a proprietary client application (e.g., Oracle Forms), or some other application, which may be used by a user of the client computing device to interact with the cloud infrastructure system 802 to use services provided by the cloud infrastructure system 802.

In various examples, the cloud infrastructure system 802 may also provide "big data" and related computation and analysis services. The term "big data" is generally used to refer to extremely large data sets that can be stored and manipulated by analysts and researchers to visualize large amounts of data, detect trends, and/or otherwise interact with the data. The analysis the cloud infrastructure system 802 can perform may involve using, analyzing, and manipulating large data sets to detect and visualize various trends, behaviors, relationships, etc. within the data. This analysis may be performed by one or more processors, possibly processing the data in parallel, performing simulations using the data, and the like. The data used for this analysis may include structured data (e.g., data stored in a database or structured according to a structured model) and/or unstructured data (e.g., data blobs (binary large objects)).

As depicted in the embodiment in FIG. 8, cloud infrastructure system 802 may include infrastructure resources 830 that are used for facilitating the provision of various cloud services offered by cloud infrastructure system 802. Infrastructure resources 830 may include, for example, processing resources, storage or memory resources, networking resources, and the like.

In some examples, to facilitate efficient provisioning of these resources for supporting the various cloud services provided by cloud infrastructure system 802 for different customers, the resources may be bundled into sets of resources or resource modules (also referred to as "pods"). Each resource module or pod may comprise a pre-integrated and optimized combination of resources of one or more types. In some examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

The cloud infrastructure system 802 may itself internally use the services 832 that are shared by different components of cloud infrastructure system 802 and which facilitate the provisioning of services by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In various examples, the cloud infrastructure system 802 may include multiple subsystems. These subsystems may be implemented in software, or hardware, or combinations thereof. As depicted in FIG. 8, the subsystems may include a user interface subsystem w that enables users or customers of cloud infrastructure system 802 to interact with cloud infrastructure system 802. The user interface subsystem 812 may include various different interfaces such as a web interface 814, an online store interface 816 where cloud services provided by cloud infrastructure system 802 are advertised and are purchasable by a consumer, and other interfaces 818. For example, a customer may, using a client device, request (service request 834) one or more services provided by cloud infrastructure system 802 using one or more of interfaces 814, 816, 818. For example, a customer may access the online store, browse cloud services offered by cloud infrastructure system 802, and place a subscription order for one or more services offered by cloud infrastructure system 802 that the customer wishes to subscribe to. The service request may include information identifying the customer and one or more services that the customer desires to subscribe to. For example, a customer may place a subscription order for services such as those discussed above. As part of the order, the customer may provide information identifying the amount of resources the customer needs and/or for what time frame, among other things.

In some examples, such as the example depicted in FIG. 8, the cloud infrastructure system 802 may include an order management subsystem (OMS) 820 that is configured to process the new order. As part of this processing, OMS 820 may be configured to: generate an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning, among other operations.

Once properly validated, OMS 820 may then invoke the order provisioning subsystem (OPS) 824 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 824 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

The cloud infrastructure system 802 may send a response or notification 844 to the requesting customer to indicate when the requested service is now ready for use. In some instances, information (e.g., a link) may be sent to the customer that enables the customer to start using and availing the benefits of the requested services.

The cloud infrastructure system 802 may provide services to multiple customers. For each customer, the cloud infrastructure system 802 is responsible for managing information related to one or more subscription orders received from the customer, maintaining customer data related to the orders, and providing the requested services to the customer. The cloud infrastructure system 802 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

The cloud infrastructure system 802 may provide services to multiple customers in parallel. The cloud infrastructure system 802 may store information for these customers, including possibly proprietary information. In some examples, the cloud infrastructure system 802 includes an identity management subsystem (IMS) 828 that is configured to manage customer-specific information and provide the separation of the managed information such that information related to one customer is not accessible by another customer. IMS 828 may be configured to provide various security-related services such as identity services, such as information access management, authentication and authorization services, services for managing customer identities and roles and related capabilities, and the like.

Figure 9:
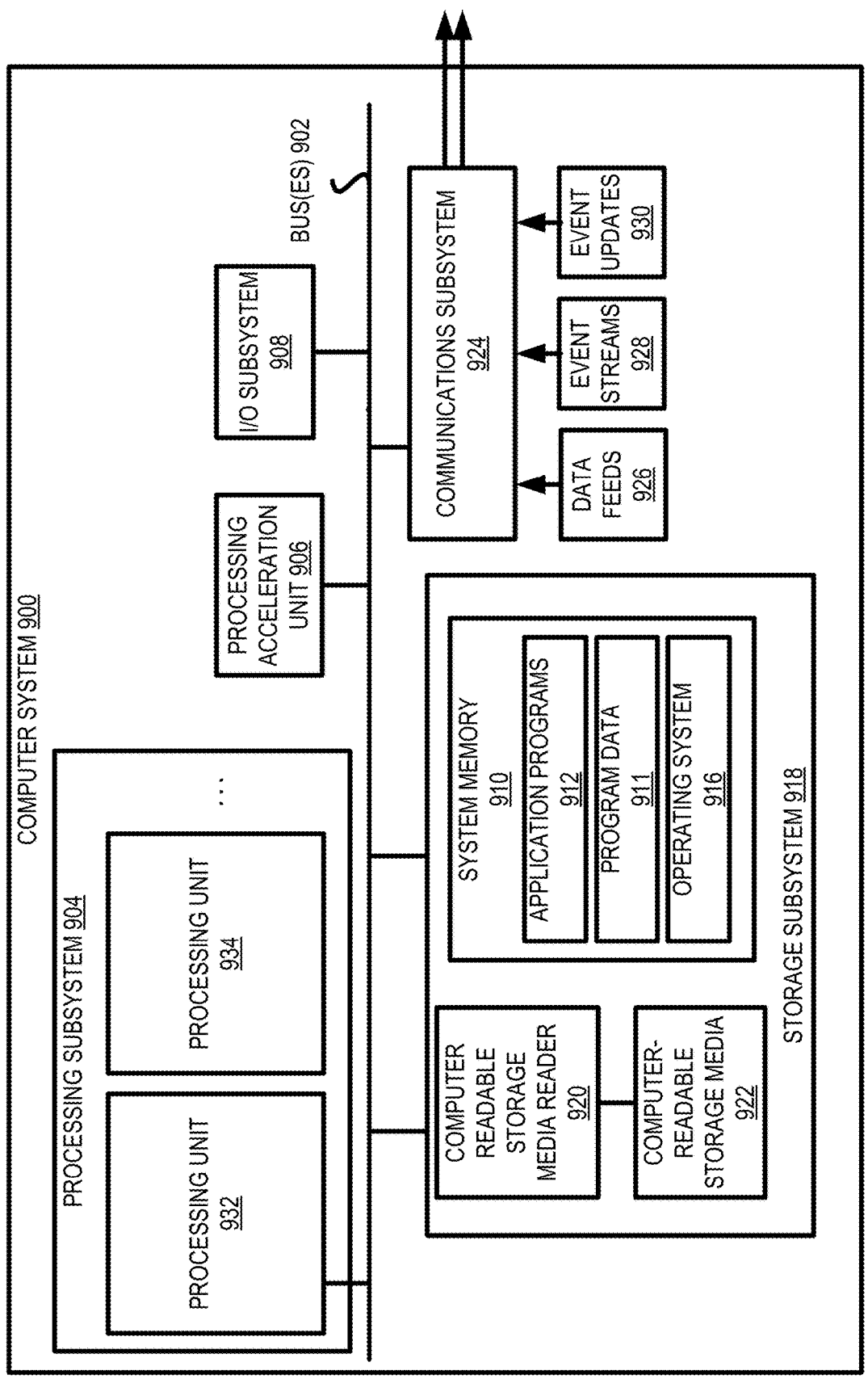
FIG. 9 is a schematic illustration of a computer system configured to perform techniques in accordance with certain embodiments of the present invention.

Referring now to FIG. 9, an example is shown of a computer system 900 that may be used to implement the various examples discussed above. In some examples, the computer system 900 may be used to implement any of the various servers and computer systems described above. As shown in FIG. 9, the computer system 900 includes various subsystems including a processing subsystem 904 that communicates with a number of other subsystems via a bus subsystem 902. These other subsystems may include a processing acceleration unit 906, an I/O subsystem 908, a storage subsystem 918 and a communications subsystem 924. The storage subsystem 918 may include non-transitory computer-readable storage media 922 and a system memory 910.

The bus subsystem 902 provides a mechanism for letting the various components and subsystems of the computer system 900 communicate with each other as intended. Although the bus subsystem 902 is shown schematically as a single bus, alternate examples of the bus subsystem may utilize multiple buses. The bus subsystem 902 may be any of several types of bus structures including a memory bus or memory controller, a peripheral bus, a network bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard, and the like. It may also utilize networking based architecture such as sockets, pipes, TCP/IP, wired or wireless, local, virtual, cellular and others.

The processing subsystem 904 controls the operation of the computer system 900 and may comprise one or more processors, application specific integrated circuits (ASICs), or field programmable gate arrays (FPGAs). The processors may include be single core or multi-core processors. The processing resources of computer system 900 can be organized into one or more processing units 932, 934. A processing unit may include one or more processors, including single core or multi-core processors, one or more cores from the same or different processors, a combination of cores and processors, or other combinations of cores and processors. In some examples, the processing subsystem 904 can include one or more special purpose co-processors such as graphics processors, digital signal processors (DSPs), or the like. In some examples, some or all of the processing units of the processing subsystem 904 can be implemented using customized circuits, such as application specific integrated circuits (ASICs), or field programmable gate arrays (FPGAs).

In some examples, the processing units in the processing subsystem 904 can execute instructions stored in the system memory 910 or on the computer readable storage media 922. In various examples, the processing units can execute a variety of programs or code instructions and can maintain multiple concurrently executing programs or processes. At any given time, some or all of the program code to be executed can be resident in the system memory 910 and/or on the computer-readable storage media 922 including potentially on one or more storage devices. Through suitable programming, the processing subsystem 904 can provide various functionalities described above. In instances where computer system 900 is executing one or more virtual machines, one or more processing units may be allocated to each virtual machine In some examples, a processing acceleration unit 906 may be provided for performing customized processing or for off-loading some of the processing performed by the processing subsystem 904 so as to accelerate the overall processing performed by the computer system 900.

The I/O subsystem 908 may include devices and mechanisms for inputting information to the computer system 900 and/or for outputting information from or via the computer system 900. In general, use of the term "input device" is intended to include all possible types of devices and mechanisms for inputting information to the computer system 900. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

In general, use of the term "output device" is intended to include all possible types of devices and mechanisms for outputting information from computer system 900 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

The storage subsystem 918 provides a repository or data store for storing information that is used by the computer system 900. The storage subsystem 918 provides a tangible non-transitory computer-readable storage medium for storing the basic programming and data constructs that provide the functionality of some examples. Software (e.g., programs, code modules, instructions) that when executed by the processing subsystem 904 provide the functionality described above may be stored in the storage subsystem 918. The software may be executed by one or more processing units of the processing subsystem 904. The storage subsystem 918 may also provide a repository for storing data used in accordance with the present disclosure.

The storage subsystem 918 may include one or more non-transitory memory devices, including volatile and non-volatile memory devices. As shown in FIG. 9, the storage subsystem 918 includes a system memory 910 and a computer-readable storage media 922. The system memory 910 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within the computer system 900, such as during start-up, may typically be stored in the ROM. The RAM typically contains data and/or program modules that are presently being operated and executed by the processing subsystem 904. In some implementations, the system memory 910 may include multiple different types of memory, such as static random access memory (SRAM) or dynamic random access memory (DRAM), and the like.

By way of example, and not limitation, as depicted in FIG. 9, the system memory 910 may load application programs 912 that are being executed, which may include client applications, Web browsers, mid-tier applications, relational database management systems (RDBMS), etc., program data 911, and an operating system 916. By way of example, the operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

The computer-readable storage media 922 may store programming and data constructs that provide the functionality of some examples. The computer-readable media 922 may provide storage of computer-readable instructions, data structures, program modules, and other data for the computer system 900. Software (programs, code modules, instructions) that when executed by the processing subsystem 904 provides the functionality described above that may be stored in the storage subsystem 918. By way of example, the computer-readable storage media 922 may include non-volatile memory such as a hard disk drive, a magnetic disk drive, an optical disk drive such as a CD ROM, DVD, a Blu-Ray® disk, or other optical media. The computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The computer-readable storage media 922 may provide storage of computer-readable instructions, data structures, program modules, and other data for the computer system 900.

In some examples, the storage subsystem 918 may also include a computer-readable storage media reader 920 that can further be connected to the computer-readable storage media 922. The reader 920 may receive and be configured to read data from a memory device such as a disk, a flash driver, etc.

In some examples, the computer system 900 may support virtualization technologies, including but not limited to virtualization of processing and memory resources. For example, the computer system 900 may provide support for executing one or more virtual machines. The computer system 900 may execute a program such as a hypervisor that facilitates the configuring and managing of the virtual machines. Each virtual machine generally runs independently of the other virtual machines. A virtual machine may be allocated memory, compute (e.g., processors, cores), I/O, and networking resources. Each virtual machine typically runs its own operating system, which may be the same as or different from the operating systems executed by other virtual machines executed by the computer system 900. Accordingly, multiple operating systems may potentially be run concurrently by the computer system 900.

The communications subsystem 924 provides an interface to other computer systems and networks. The communications subsystem 924 serves as an interface for receiving data from and transmitting data to other systems from the computer system 900. For example, the communications subsystem 924 may enable the computer system 900 to establish a communication channel to one or more client computing devices via the Internet for receiving and sending information from and to the client computing devices.

The communication subsystem 924 may support both wired and/or wireless communication protocols. For example, in some examples, the communications subsystem 924 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 802.11 family standards, or other mobile communication technologies, or any combination thereof), global positioning system (GPS) receiver components, and/or other components. In some examples, the communications subsystem 924 can provide wired network connectivity (e.g., Ethernet) in addition to or instead of a wireless interface.

The communication subsystem 924 can receive and transmit data in various forms. For example, in some examples, the communications subsystem 924 may receive input communication in the form of structured and/or unstructured data feeds 926, event streams 928, event updates 930, and the like. For example, the communications subsystem 924 may be configured to receive (or send) data feeds 926 in real-time from users of social media networks and/or other communication services such as Twitter® feeds, Facebook® updates, web feeds such as Rich Site Summary (RSS) feeds, and/or real-time updates from one or more third party information sources.

In some examples, the communications subsystem 924 may be configured to receive data in the form of continuous data streams, which may include event streams 928 of real-time events and/or event updates 930, that may be continuous or unbounded in nature with no explicit end.

Examples of applications that generate continuous data may include, for example, sensor data applications, financial tickers, network performance measuring tools (e.g. network monitoring and traffic management applications), clickstream analysis tools, automobile traffic monitoring, and the like.

The communications subsystem 924 may also be configured to output the structured and/or unstructured data feeds 926, event streams 928, event updates 930, and the like to one or more databases that may be in communication with one or more streaming data source computers coupled to the computer system 900.

The computer system 900 can be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system.

Due to the ever-changing nature of computers and networks, the description of the computer system 900 depicted in FIG. 9 is intended only as a specific example. Many other configurations having more or fewer components than the system depicted in FIG. 9 are possible. Based on the disclosure and teachings provided herein, a person of ordinary skill in the art will appreciate other ways and/or methods to implement the various examples.

Although specific implementations have been described, various modifications, alterations, alternative constructions, and equivalents are possible. Implementations described in the present disclosure are not restricted to operation within certain specific data processing environments, but are free to operate within a plurality of data processing environments. Additionally, although implementations have been described using a particular series of transactions and steps, it should be apparent to those skilled in the art that this is not intended to be limiting. Although some flowcharts describe operations as a sequential process, many of the operations can be performed in parallel or concurrently. In addition, the order of the operations may be rearranged. A process may have additional steps not included in the figure. Various features and aspects of the above-described implementations may be used individually or jointly.

Further, while implementations described in the present disclosure have been described using a particular combination of hardware and software, it should be recognized that other combinations of hardware and software are also possible. Some implementations described herein may be implemented only in hardware, or only in software, or using combinations thereof. The various processes described herein can be implemented on the same processor or different processors in any combination.

Where devices, systems, components, or modules are described as being configured to perform certain operations or functions, such configuration can be accomplished, for example, by designing electronic circuits to perform the operation, by programming programmable electronic circuits (such as microprocessors) to perform the operation, such as by executing computer instructions or code, or processors or cores programmed to execute code or instructions stored on a non-transitory memory medium, or any combination thereof. Processes can communicate using a variety of techniques including, but not limited to, conventional techniques for inter-process communication, and different pairs of processes may use different techniques, or the same pair of processes may use different techniques at different times.

Specific details are given in this disclosure to provide a thorough understanding of the embodiments. However, embodiments may be practiced without these specific details. For example, well-known circuits, processes, algorithms, structures, and techniques have been shown without unnecessary detail in order to avoid obscuring the embodiments. This description provides example embodiments only, and is not intended to limit the scope, applicability, or configuration of other embodiments. Rather, the preceding description of the embodiments will provide those skilled in the art with an enabling description for implementing various embodiments. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope of the disclosure. Thus, although specific implementations have been described, these are not intended to be limiting; various modifications and equivalents are within the scope of the disclosure.

What is claimed is:

1. A system comprising:
   one or more processors; and
   one or more memory devices comprising instructions that, when executed by the one or more processors, cause the system to perform operations comprising:
   receiving a request to replicate data from a first storage device to a second storage device;
   accessing data associated with a plurality of queries previously executed on the first storage device;
   determining one or more database objects associated with the plurality of queries;
   calculating one or more access metrics for the one or more database objects indicating how the one or more database objects were accessed by the plurality of queries;
   determining a subset of the one or more database objects for replication based at least in part on the access metrics for the one or more database objects; and
   initiating a data replication process to replicate the subset of the one or more database objects from the first storage device to the second storage device that prioritizes the subset of the one or more database objects relative to a remainder of the one or more database objects.

2. The system of claim 1, wherein determining one or more database objects associated with the plurality of queries comprises:
   for each query in the plurality of queries, determining a set of database objects that was accessed during the execution of the query.

3. The system of claim 1, wherein determining one or more database objects associated with the plurality of queries comprises:
   determining one or more database objects that were potentially accessed but not definitely accessed during the execution of the plurality of queries based at least in part on one or more corresponding query texts.

4. The system of claim 1, wherein determining one or more database objects associated with the plurality of queries comprises:
   determining a first database object that was definitely accessed during execution of the plurality of queries based on one or more corresponding query texts; and
   determining a second database object that was potentially accessed but not definitely accessed during the execution of the plurality of queries based on the one or more query texts.

5. The system of claim 4, wherein calculating the one or more access metrics for the one or more database objects comprises:
   assigning different weight values to the first database object and the second database object based on a determination that the first database object was definitely accessed during execution of the plurality of queries and that the second database object was potentially accessed but not definitely accessed during the execution of the plurality of queries.

6. The system of claim 1, wherein calculating the one or more access metrics for the one or more database objects comprises:
   determining query execution times for the plurality of queries; and
   assigning weight values to the one or more database objects based at least in part on the plurality of query execution times.

7. The system of claim 1, wherein determining the subset of the one or more database objects for replication comprises:
   identifying database objects that are associated with a highest percentage of the plurality of queries.

8. A method of prioritizing replication of database objects between storage devices, the method comprising:
   receiving a request to replicate data from a first storage device to a second storage device;
   accessing data associated with a plurality of queries previously executed on the first storage device;
   determining one or more database objects associated with the plurality of queries;
   calculating one or more access metrics for the one or more database objects indicating how the one or more database objects were accessed by the plurality of queries;
   determining a subset of the one or more database objects for replication based at least in part on the access metrics for the one or more database objects; and
   initiating a data replication process to replicate the subset of the one or more database objects from the first storage device to the second storage device that prioritizes the subset of the one or more database objects relative to a remainder of the one or more database objects.

9. The method of claim 8, wherein determining the subset of the one or more database objects for replication comprises:
   identifying database objects that were executed a greatest number of times during execution of the plurality of queries.

10. The method of claim 8, wherein the one or more database objects is comprised of one or more of:
    database tables;
    specific columns within database tables;
    user profiles; or
    indexes.

11. The method of claim 8, further comprising:
    causing a bar graph to be generated in a user interface to reflect the one or more access metrics.

12. The method of claim 8, wherein determining a subset of the one or more database objects for replication comprises:
    identifying a predetermined number of most accessed database objects in the one or more database objects.

13. The method of claim 8, wherein determining the one or more database objects associated with the plurality of queries comprises:
   identifying table names referenced in the plurality of queries.

14. The method of claim 8, further comprising re-executing a portion of the plurality of queries to identify database tables that were actually accessed.

15. A non-transitory computer-readable medium comprising instructions that, when executed by one or more processors, cause the one or more processors to perform operations comprising:
   receiving a request to replicate data from a first storage device to a second storage device;
   accessing data associated with a plurality of queries previously executed on the first storage device;
   determining one or more database objects associated with the plurality of queries;
   calculating one or more access metrics for the one or more database objects indicating how the one or more database objects were accessed by the plurality of queries;
   determining a subset of the one or more database objects for replication based at least in part on the access metrics for the one or more database objects; and
   initiating a data replication process to replicate the subset of the one or more database objects from the first storage device to the second storage device that prioritizes the subset of the one or more database objects relative to a remainder of the one or more database objects.

16. The non-transitory computer-readable medium of claim 15, wherein the one or more access metrics indicate a percentage of the plurality of queries that accessed the one or more database objects at least once.

17. The non-transitory computer-readable medium of claim 15, wherein the one or more access metrics indicate a percentage of columns in a database table that were accessed at least once.

18. The non-transitory computer-readable medium of claim 15, wherein the one or more access metrics indicate a number of times a database object was modified.

19. The non-transitory computer-readable medium of claim 15, wherein the one or more access metrics indicate a number of times a database object was accessed by a particular user or user group.

20. The non-transitory computer-readable medium of claim 15, wherein the one or more access metrics are calculated using a weighted combination of scores, wherein weights used in the weighted combination favor more recent access.

* * * * *

UNITED STATES PATENT AND TRADEMARK OFFICE
CERTIFICATE OF CORRECTION

| | |
|---|---|
| PATENT NO. | : 11,243,981 B2 |
| APPLICATION NO. | : 17/009515 |
| DATED | : February 8, 2022 |
| INVENTOR(S) | : O'Shaughnessy |

It is certified that error appears in the above-identified patent and that said Letters Patent is hereby corrected as shown below:

In the Specification

In Column 3, Line 46, delete "1001.81 In" and insert -- In --, therefor.

In Column 9, Line 35, delete "Transport" and insert -- Transfer --, therefor.

In Columns 15-16, Line 5, delete "eXecution" and insert -- execution --, therefor.

In Columns 17-18, Line 18, delete "SQL." and insert -- SQL --, therefor.

In Columns 17-18, Line 67, delete "used" and insert -- used. --, therefor.

In Column 25, Line 22, delete "Transport" and insert -- Transfer --, therefor.

In Column 31, Line 3, delete "machine" and insert -- machine. --, therefor.

In Column 33, Line 44, delete "evolution)" and insert -- evolution)) --, therefor.

Signed and Sealed this
Fifth Day of July, 2022

*Katherine Kelly Vidal*

Katherine Kelly Vidal
*Director of the United States Patent and Trademark Office*